United States Patent
Starobin et al.

(10) Patent No.: US 10,341,793 B2
(45) Date of Patent: Jul. 2, 2019

(54) SYSTEM AND METHOD FOR PROVIDING USER LOCATION-BASED MULTI-ZONE MEDIA

(71) Applicant: Sound United, LLC, Vista, CA (US)

(72) Inventors: Bradley M. Starobin, Baltimore, MD (US); Matthew Lyons, York, PA (US); Stuart W. Lumsden, Ruxton, MD (US); Michael DiTullo, Encinitas, CA (US); Paul O'Connor, Portland, OR (US)

(73) Assignee: Sound United, LLC., Vista, CA (US)

( * ) Notice: Subject to any disclaimer, the term of this patent is extended or adjusted under 35 U.S.C. 154(b) by 22 days.

(21) Appl. No.: 15/645,447

(22) Filed: Jul. 10, 2017

(65) Prior Publication Data

US 2017/0325037 A1    Nov. 9, 2017

Related U.S. Application Data

(63) Continuation of application No. 14/726,019, filed on May 29, 2015, now Pat. No. 9,706,320.

(51) Int. Cl.

| H04R 27/00 | (2006.01) |
| G06F 3/16 | (2006.01) |
| G06F 3/041 | (2006.01) |
| G06F 3/0488 | (2013.01) |

(52) U.S. Cl.
CPC ............. *H04R 27/00* (2013.01); *G06F 3/041* (2013.01); *G06F 3/0488* (2013.01); *G06F 3/165* (2013.01); *G06F 3/167* (2013.01); *H04R 2227/003* (2013.01); *H04R 2227/005* (2013.01); *H04R 2430/01* (2013.01)

(58) Field of Classification Search
CPC ...... H04R 27/00; H04R 3/12; H04R 2420/03; G06F 3/165
See application file for complete search history.

(56) References Cited

U.S. PATENT DOCUMENTS

| 2012/0163603 A1 | 6/2012 | Abe |
| 2013/0024018 A1 | 1/2013 | Chang |
| 2014/0064501 A1 | 3/2014 | Olsen |
| 2014/0244013 A1 | 8/2014 | Reilly |
| 2015/0010169 A1 | 1/2015 | Popova |
| 2015/0104037 A1 | 4/2015 | Lee |
| 2015/0189438 A1 | 7/2015 | Hampiholi |
| 2015/0222987 A1 | 8/2015 | Angel, Jr. |
| 2016/0353218 A1 | 12/2016 | Starobin |

*Primary Examiner* — Regina N Holder
(74) *Attorney, Agent, or Firm* — McAndrews, Held & Malloy, Ltd.

(57) ABSTRACT

A system and method for providing user location-based multi-zone media. As a non-limiting example, various aspects of this disclosure provide a system and method that flexibly presents media content (e.g., audio content) to a user as the user moves throughout a premises. As a non-limiting example, various aspects of this disclosure provide a system and method that flexibly presents media content (e.g., audio content) to a user as the user moves throughout a premises.

22 Claims, 8 Drawing Sheets

SYSTEM AND METHOD FOR PROVIDING USER LOCATION-BASED MULTI-ZONE MEDIA

CROSS-REFERENCE TO RELATED APPLICATIONS/INCORPORATION BY REFERENCE

The present application is a CONTINUATION of U.S. patent application Ser. No. 14/726,019, filed May 29, 2015, which is titled "System and Method for Providing User Location-based Multi-zone Media," which is related to U.S. application Ser. No. 14/725,904, filed May 29, 2015, titled "Multi-zone Media System and Method for Providing Multi-zone Media," the contents of which are hereby incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND

Present systems and methods for presenting audio, for example presenting audio to a user as the user moves throughout a premises, are inadequate. Further limitations and disadvantages of conventional and traditional approaches will become apparent to one of skill in the art, through comparison of such approaches with the present disclosure as set forth in the remainder of the present application with reference to the drawings.

BRIEF DESCRIPTION OF SEVERAL VIEWS OF THE DRAWINGS

The accompanying drawings are included to provide a further understanding of the present disclosure, and are incorporated in and constitute a part of this specification. The drawings illustrate examples of the present disclosure and, together with the description, serve to explain various principles of the present disclosure. In the drawings.

SUMMARY

Figure 1:
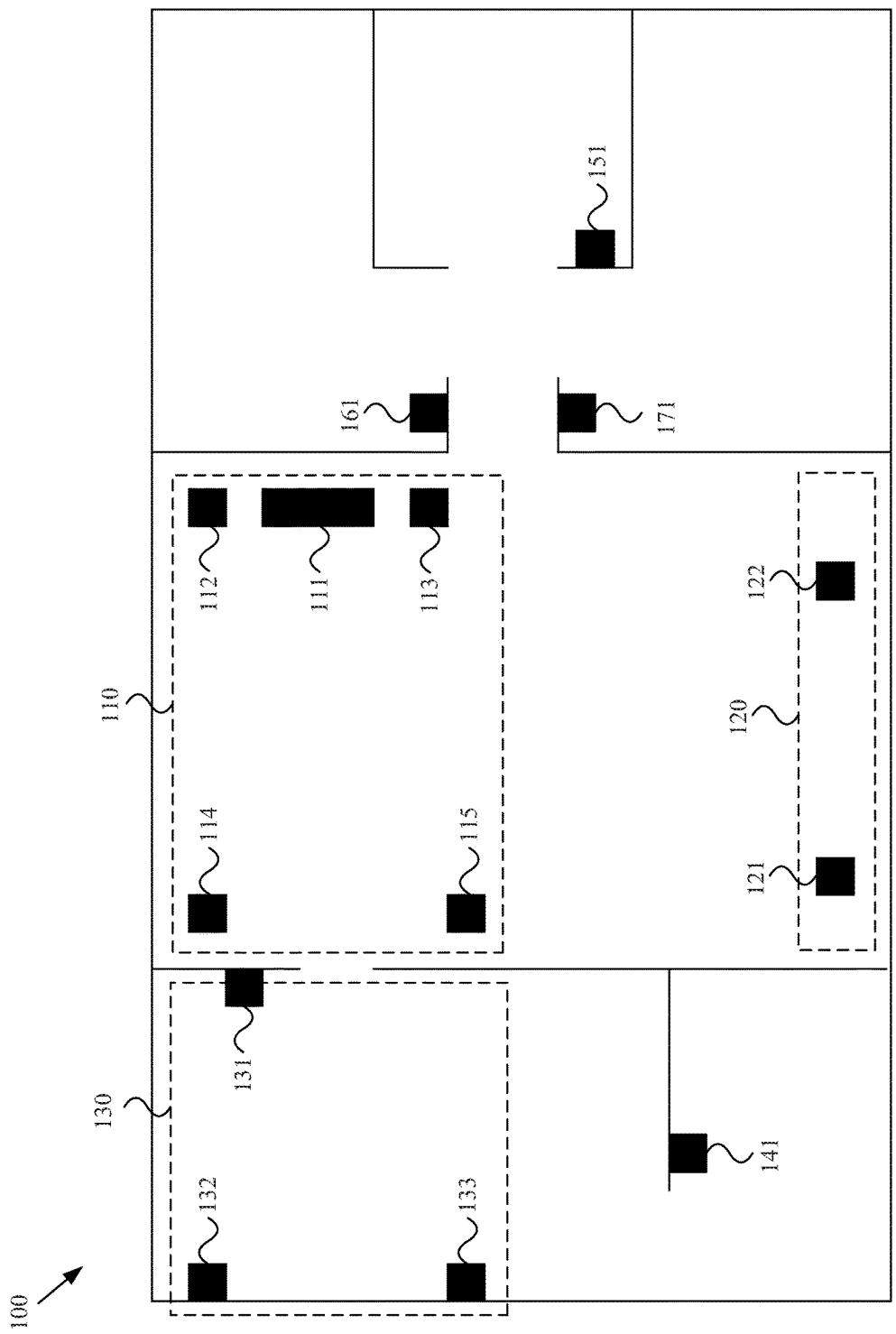
FIG. 1 is a diagram of an example multi-zone media environment, in accordance with various aspects of the present disclosure.

Various aspects of this disclosure provide a system and method for providing user location-based multi-zone media. As a non-limiting example, various aspects of this disclosure provide a system and method that flexibly presents media content (e.g., audio content) to a user as the user moves throughout a premises.

DETAILED DESCRIPTION OF VARIOUS ASPECTS OF THE DISCLOSURE

The following discussion presents various aspects of the present disclosure by providing various examples thereof. Such examples are non-limiting, and thus the scope of various aspects of the present disclosure should not necessarily be limited by any particular characteristics of the provided examples. In the following discussion, the phrases "for example," "e.g.," and "exemplary" are non-limiting and are generally synonymous with "by way of example and not limitation," "for example and not limitation," and the like.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. Similarly, the term "module" may be utilized herein to refer to a pure hardware module and/or a hybrid hardware/software module (e.g., a processor that operates in accordance with software instructions stored in a memory or other non-transitory medium).

As utilized herein, "and/or" means any one or more of the items in the list joined by "and/or". As an example, "x and/or y" means any element of the three-element set $\{(x), (y), (x, y)\}$. In other words, "x and/or y" means "one or both of x and y." As another example, "x, y, and/or z" means any element of the seven-element set $\{(x), (y), (z), (x, y), (x, z), (y, z), (x, y, z)\}$. In other words, "x, y and/or z" means "one or more of x, y, and z." As utilized herein, the term "exemplary" means serving as a non-limiting example, instance, or illustration. As utilized herein, the terms "e.g." and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "has," "comprising," "including," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example a device may be turned sideways so that its "top" surface is facing horizontally and its "side" surface is facing vertically, without departing from the teachings of the present disclosure.

Various aspects of the present disclosure comprise a multi-zone media system and method for providing multi-zone media. For example, various aspects of this disclosure provide a system and method that flexibly presents media content (e.g., audio content) to a user as the user moves throughout a premises.

The above and other aspects of the present disclosure will be described in or be apparent from the following description of various example implementations.

FIG. 1 is a diagram of an example multi-zone media environment 100, in accordance with various aspects of the present disclosure.

The example environment 100 comprises a variety of loudspeakers and groups thereof, spaced throughout an example premises (e.g., a home, office, campus, etc.). A campus implementation may, for example, include outdoor areas as well as indoor areas associated with one or more buildings. The discussion of various examples herein will often refer to the example environment 100. Though the example environment 100 is generally presented in the context of audio media presentation, it should be understood that the example environment 100 and all examples presented herein readily extend to the presentation of other forms of media (e.g., video media).

The example environment 100 may, for example, comprise a first group of loudspeakers 110, which may also be referred to herein as a zone. The first group of loudspeakers 110 may, for example, correspond to a first area (or audio zone) of a premises, for example a family room, media room, etc. The first group of loudspeakers 110 may, for example, comprise a central media controller 111. The central media controller 111 may comprise characteristics of any of a variety of central media controllers (e.g., an entertainment center, audio receiver, home media hub, home audio server, general purpose computer operating in accordance with software instructions, an Internet media access point or content server, etc.). The central media controller 111 may generally, for example, manage the presentation of media content throughout the example environment 100. Though the example environment 100 is generally shown and discussed as having a central media controller 111, it should be understood that the environment 100 may also operate in a mesh-type or decentralized configuration. For example, as will be discussed herein, any of the media presentation devices (e.g., loudspeakers, etc.) discussed herein may perform any or all of the control functionality discussed herein.

The first group of loudspeakers 110 may also, for example, comprise a first (e.g., front left) loudspeaker 112, a second (e.g., front right) loudspeaker 113, a third (e.g., rear right) loudspeaker 114, and a fourth (e.g., rear left) loudspeaker 115. The central media controller 111 may also, for example, comprise a loudspeaker. Each of the first group of loudspeakers 110 may, for example, be operated independently or may be operated as a single group. Each of the first group of loudspeakers 110 may, for example, operate under the control of the central media controller 111 and/or operate autonomously. Note that the designations of the loudspeakers as left, right, front, rear, center, etc. may, but need not, refer to audio spatial arrangements generally synonymous with various loudspeaker arrangements (e.g., stereo, surround sound, monaural, etc.).

The example environment 100 may also, for example, comprise a second group of loudspeakers 120. The second group of loudspeakers 120 may, for example, comprise a first (e.g., right) loudspeaker 121 and a second (e.g., left) loudspeaker 122. The second group of loudspeakers 120 may, for example, correspond to a second area of a premises, for example a kitchen or dining room, a break room, etc. Each of the second group of loudspeakers 120 may, for example, be operated independently or may be operated as a single group. Each of the second group of loudspeakers 120 may, for example, operate under the control of the central media controller 111 and/or operate autonomously. Also for example, any or all of the second group of loudspeakers 120 may operate with any or all of the other loudspeakers in the environment 100.

The example environment 100 may additionally, for example, comprise a third group of loudspeakers 130. The third group of loudspeakers 130 may, for example, comprise a first (e.g., central) loudspeaker 131, a second (e.g., right) loudspeaker 132, and a third (e.g., left) loudspeaker 133. The third group of loudspeakers 130 may, for example, correspond to a third area of a premises, for example a master bedroom, garage, shop, etc. Each of the third group of loudspeakers 130 may, for example, be operated independently or may be operated as a single group. Each of the third group of loudspeakers 130 may, for example, operate under the control of the central media controller 111 and/or operate autonomously. Also for example, any or all of the third group of loudspeakers 130 may operate with any or all of the other loudspeakers in the environment 100.

The example environment 100 may further, for example, comprise a loudspeaker 141 in a fourth area (or room or zone) (e.g., in a master bath), a loudspeaker 151 in a fifth area (e.g., in a guest bath), a loudspeaker 161 in a sixth area (e.g., in a guest room), and a loudspeaker 171 in a seventh area (e.g., in an office).

Figure 2:
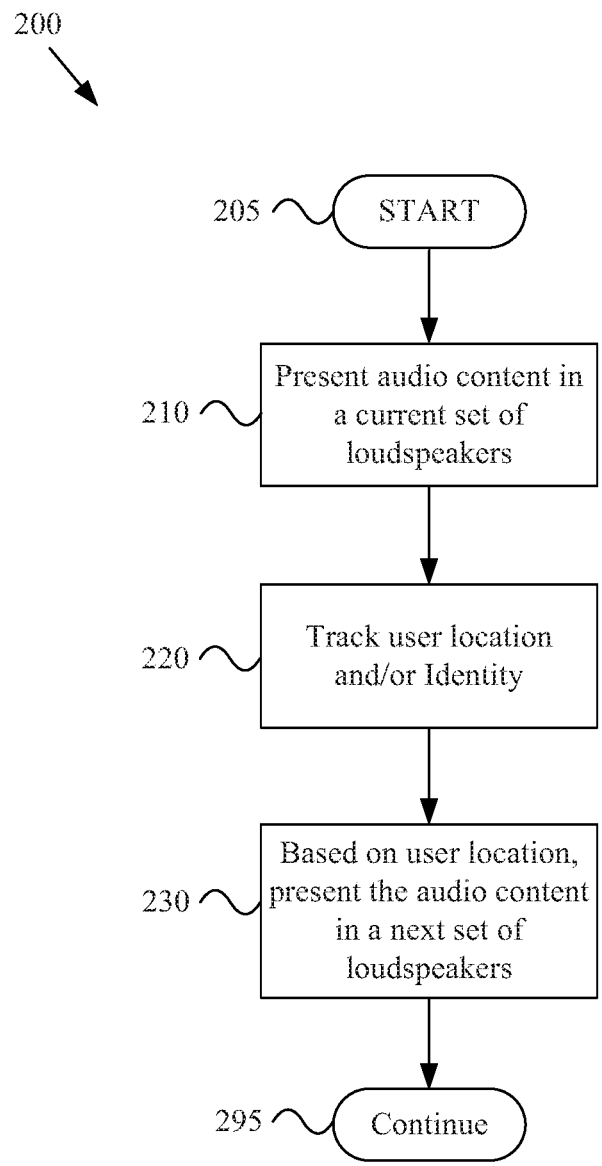
FIG. 2 is a flow diagram of an example method for providing multi-zone media, in accordance with various aspects of the present disclosure.

Referring next to FIG. 2, such figure is a flow diagram of an example method 200 for providing multi-zone media, in accordance with various aspects of the present disclosure. The example method 200 may, for example, share any or all characteristics with the other methods discussed herein (e.g., with regard to FIGS. 3-6). For example, any or all blocks of the example method 200 may be integrated into any of such methods and vice versa. The example method 200, or any portion thereof, may be implemented at a loudspeaker, a central media controller, a plurality of system components, etc.

The example method 200 begins executing at block 205. The example method 200 may begin executing in response to any of a variety of causes or conditions. The method 200 may, for example, begin executing when a media presentation system implementing the method 200 is powered up, reset, or turned on. The method 200 may also, for example, begin executing when a media presentation system implementing the method 200 receives a command from a user to present audio content and/or to present audio content in a manner that permits the user to flexibly play or transfer music to various zones (e.g., receiving a command directly at the system, receiving a command from a remote controller, receiving a command from a user's smart phone, etc.). The method 200 may further, for example, begin executing in response to the media presentation system (e.g., a controller, loudspeaker, etc.) exiting from a sleep mode. Also for example, the method 200 may begin executing in response to detecting a user input (e.g., a touch command, a voice command, etc.) at a component of the media presentation system (e.g., at a loudspeaker, at a controller, at a sensor independent of a loudspeaker or controller, etc.). Additionally, for example, the method 200 may begin executing in response to detecting a user input at a sensor physically independent of yet communicatively coupled to a media presentation system or a component thereof (e.g., a sensor of a security system, home control system for a smart home, home environmental control system, etc., that is communicatively coupled to a media presentation system implementing various aspects of the present disclosure). Still further for example, block 205 may receive execution flow from any of the blocks of the example method 200 and/or from any flow diagram block discussed herein (e.g., at FIGS. 3-6). In general, the method 200 may begin executing in response to any of a variety of causes or conditions. Accordingly, the scope of this disclosure should not be limited by characteristics of any particular initiating cause or condition.

The example method 200 may, at block 210, comprise presenting audio content. For example, block 210 may comprise generating and communicating signals to loudspeaker amplifier circuitry that cause a current set of one or more loudspeakers to output audio content in human-perceivable form. For example, block 210 may comprise presenting the audio content at the current set of loudspeakers and having selected audio presentation characteristics (e.g., selected volume, equalization or magnitude response shape, spatialization, limiting, etc.). For example, block 210 may comprise performing any of a variety of types of digital signal processing associated with the presentation of audio content. Block 210 may, for example, comprise generating and communicating signals having the necessary frequency content, amplitude, timing, etc. The audio content may, for example, comprise characteristics of any of a variety of different types of audio content (e.g., music, video soundtrack, telephone conversation, streaming audio, talk radio, etc.).

Block 210 may, for example, comprise playing audio content at a current loudspeaker or central controller implementing the method 200 or a portion of the method 200. Block 210 may also, for example, comprise playing the audio content at a current loudspeaker different from the loudspeaker or central controller implementing the method 200 or a portion of the method 200.

The example method 200 may, at block 220, comprise tracking (or monitoring) user location. Block 220 may comprise tracking user location in any of a variety of manners. For example, block 220 may comprise utilizing an array of sensors to track user location. Such sensors may, for example, be integrated with a loudspeaker and/or loudspeaker system implementing one or more of the aspects of the method 200 (e.g., included on or within a loudspeaker enclosure, controller enclosure, etc.). Also for example, such sensors may generally be associated with another system (e.g., a home security system, premises-based wireless communication network, etc.) that is communicatively coupled to a media presentation system implementing one or more of the aspects of the method 200. For example, a media presentation system that generally operates to present media (e.g., audio) content to a user may be integrated with such other systems to leverage their user tracking capabilities.

Block 220 may comprise tracking user location utilizing any of variety of types of sensors. For example, block 220 may comprise determining user location based on (e.g., based at least in part on, based in part on, or based only on) information from a motion sensor (e.g., active, passive, etc.), heat or IR sensor (e.g., detecting user's body heat), light sensor (e.g., detecting when a light has been turned on, when light to the light sensor has been interrupted by a passing body, etc.), vibration sensor (e.g., detecting structural vibrations due to a user walking by), sound sensor (e.g., detection of nearby noise, voice detection, voice recognition, voice identification, etc.), operation of home control mechanisms (e.g., light switches, water control valves, thermostats, appliances, blinds, ceiling fans, etc.), door operation (e.g., interior door, exterior door, garage door, refrigerator door, washer/dryer door, cabinet door, dresser drawers, etc.), operation of home electronic devices (e.g., computers, stereos, video games, home entertainment systems, intercom systems, etc.). For example, loudspeaker location and sensor location may be known, so user proximity detected by a particular sensor may be tied to one or more loudspeakers (e.g., individually, logically grouped into a set of loudspeakers or audio zone, etc.).

Block 220 may also, for example, comprise determining user location based at least in part on one or more signals received from a personal electronic device (e.g., a carryable and/or wearable device, a smart phone, a watch, a wireless earpiece, a wearable pendant, a bracelet, a ring, etc.). For example, a receiver at a known location detecting a wireless signal may determine how close the user is to the receiver based, at least in part, on signal strength. Also for example, a plurality of receivers receiving a wireless signal at respective signal strengths may be utilized to triangulate the user's position. Further for example, a personal electronic device worn or carried by the user may have its own position-determining capability (e.g., GPS, cellular triangulation, Wi-Fi triangulation, etc.), and then communicate the user's location within the premises to the media presentation system (e.g., to a loudspeaker, central controller, or other equipment implementing one or more aspects of the example method 200).

Various aspects of the method 200 (and the other methods discussed herein) may comprise processing user location to make various media presentation decisions. Information of user location may, for example, be utilized in an absolute sense (e.g., a user is at or near a particular location). Also for example, monitored user location may be utilized to estimate user travel trajectory for various anticipatory operational aspects, examples of which are provided herein.

Block 220 may, for example, comprise tracking location of a single user or multiple users. For example, in an example implementation in which a system implementing the method 200 is providing audio content to a plurality of users, block 220 may comprise tracking the location of each user and providing respective audio content to each user.

For example, various sensors may be utilized to determine not only user location, but also the identity of the user. For example, in an example scenario utilizing personal electronic devices to track a user, a personal electronic device may be associated with a respective user thereof. Also for example, in a scenario in which audio sensors are utilized to track a user, a user's voice may be utilized to identify the user (e.g., utilizing voice recognition and/or identification technology). Additionally for example, in a scenario in which a vibration sensor is utilized to identify the user, the user may be identified by the magnitude of the vibration (e.g., due to user mass), the gate of the vibration (e.g., due to stepping cadence), etc. Further for example, assumptions regarding user identification and/or location may be utilized to identify a user (e.g., assumptions based on a predicted movement pattern for a known user, assumptions based on the identification of a user at an immediately adjacent sensor or area, assumptions based on a user being the only user detected in a premises thus far, etc.). As an example, a user detected yet not explicitly identified in an audio presentation zone may be presumptively identified as the user that was just identified in an immediately adjacent audio presentation zone. Also for example, a user detected yet not explicitly identified in front of the television during Monday night football may be presumptively identified as the user that is typically identified at that location at that time.

As will be discussed herein, user identification information may be utilized to ensure that respective audio content (or other media content) that is being presented to a respective user may continue to be presented to that respective user as the user travels throughout a premises.

Note that block 220 may also comprise tracking user location based at least in part on direct user input to a sensor (e.g., a sensor incorporated into a loudspeaker enclosure). Non-limiting examples of such operation are presented in U.S. application Ser. No. 14/725,904, filed May 29, 2015, titled "Multi-zone Media System and Method for Providing Multi-zone Media," the contents of which are hereby incorporated herein by reference in their entirety.

In general, block 220 may comprise tracking user location and/or user identity. Block 220 may comprise performing such tracking and/or identifying in any or a variety of manners. Accordingly, the scope of various aspects of this disclosure should not be limited by characteristics of any particular manner of performing such tracking and/or identifying.

The example method 200 may, at block 230, comprise presenting the audio content in a next set of loudspeakers based at least in part on the user location and/or identity determined at block 220. For example, block 230 may comprise generating and communicating signals to loudspeaker amplifier circuitry that cause one or more loudspeakers to output the audio content. Block 230 may thus comprise presenting the audio content at the selected loudspeakers and having the selected audio presentation characteristics. Block 230 may, for example, comprise generating and communicating signals having the necessary volume, equalization or magnitude response shape, spatialization, limiting, etc. For example, block 230 may comprise performing any of a variety of types of digital signal processing associated with the presentation of audio content.

Block 230 may comprise presenting the audio content in any of a variety of manners, non-limiting examples of which will now be provided.

For example, block 230 may comprise determining that the user location identified at block 220 coincides with the user being in an audio zone (e.g., room, room area, suite of rooms, hallway, garage, general kitchen area, bedroom, outside, etc.) to which audio content is presented utilizing a particular set of one or more loudspeakers. For example, the user may have moved from the audio presentation zone serviced by a first set of loudspeakers at block 210 (e.g., the a family room zone 110 of the environment 100 of FIG. 1), and into a next audio zone serviced by a second set of loudspeakers (e.g., the kitchen zone 120 of the environment 100 of FIG. 1). Block 230 may thus comprise presenting the audio content (e.g., the same audio content presented at block 210) at the second set of loudspeakers (e.g., loudspeakers 121 and 122 of FIG. 1), for example in addition to or instead of the first set of loudspeakers (e.g., loudspeakers 112-115 of FIG. 1).

Block 230 may, for example, comprise presenting the audio content having the same general audio presentation characteristics as the audio content presented at block 210 (e.g., same general volume parameters, same general equalization parameters, etc.). Also for example, block 230 may comprise presenting the audio content having the same general audio presentation characteristics with which audio is presented at the second set of loudspeakers. For example, in an example scenario in which the user walks into a bedroom (e.g., the master bedroom zone 130 of FIG. 1), block 230 may comprise presenting the audio content at a set of loudspeakers associated with the bedroom (e.g., at loudspeakers 131-133), and having the same volume and equalization parameters of the most recent audio content presented in the bedroom. Additionally, for example, block 230 may comprise determining the audio presentation characteristics based at least in part on the user identity. For example, in an example scenario in which a particular user moves into a bathroom (e.g., bathroom associated with loudspeaker 151 of FIG. 1), block 230 may comprise presenting the audio content at loudspeakers of the bathroom (e.g., at loudspeaker 151) and having a volume that matches the volume of content presented to the particular user the last time that audio was presented to the particular user in the bathroom.

Block 230 may also, for example, comprise synchronizing the audio content presented at block 230 to other presentations of the audio content presently occurring (e.g., at block 210). For example, received audio content (e.g., in the form of data packets) may comprise timestamp information (e.g., a presentation timestamp) indicative of the intended presentation time of the audio content. Block 230 may thus ensure that the audio content is presented synchronously, in particular in a scenario in which the same audio content is being presented at other sets of loudspeakers in other audio presentation zones. Also for example, block 230 may also, for example, include synchronizing a local clock (e.g., at a loudspeaker) with a central clock (e.g., at a central control, content server, etc.). In various example implementations, the presentation of audio content from different loudspeakers may be timed or synchronized to reach a user at the same time. For example, the audio content presented from a relatively near speaker may be delayed relative to the audio content presented from a relatively far speaker so that the audio content from both the near speaker and the far speaker reach the user at the same time. Such operation may, for example, be advantageous when the audio content is only being directed to one user, or more generally to one audio zone.

Block 230 may further, for example, comprise performing conflict resolution for audio content being played at the next set of loudspeakers. For example, in a scenario in which audio content is already being played at one or more of the next set of loudspeakers, block 230 may comprise determining the audio content to be presented at such loudspeakers (e.g., resolving the potential conflict).

In an example implementation, block 230 may comprise determining which audio content to present at one or more loudspeakers based at least in part on user priority. For example, users of a system implementing the method 200 may be assigned respective priorities that block 230 may utilize to resolve audio presentation conflicts. For example, a head of household may be assigned a top priority, and other users may be assigned other respective priorities (e.g., based on age, based on chore or scholastic incentives, etc.). In an example scenario, a higher priority user may essentially take over one or more loudspeakers being utilized to present audio content to another user. Then when the higher priority user leaves the area being served by the taken-over loudspeakers, the original audio content may resume playing at such loudspeakers. Users may, for example, be assigned a same priority, in which case one or more other conflict resolution criteria may be utilized (e.g., first-come-first-served, content-based priority, etc.).

Conflict resolution criteria may also be time-based. For example, user priority or any of the conflict resolution criteria discussed herein may change according to time-of-day. For example, a first user may have top priority during the morning and afternoon, while a second user may have top priority during the evening. Such operation may also, for example, be extended to day-of-week, for example, changing priorities based on day-of-week and/or time-of-day.

Note that user-based prioritization or other conflict resolution criteria may be loudspeaker (or zone) specific. For example, a user might have a highest priority for the user's bedroom and a game room, while another user might have highest priority in common areas of the premises.

In another example implementation, block 230 may comprise determining which audio to present at one or more loudspeakers based at least in part on content priority. For example, telephone audio may take precedence over a television program or music. As an example, a user having a telephone conversation may travel through a room and take over audio presentation in the room while in it. As with all conflict resolution criteria discussed herein, content-based priority may be combined with any one or more other criteria. For example, in a particular audio zone in which Monday night football is typically presented, television audio (or even more particularly, Monday night football) may take priority over telephone audio, but only in the particular audio zone and only during Monday evening, while telephone audio may take priority over all other content anywhere else in the premises.

In still another example implementation, block 230 may comprise determining which audio to present at one or more loudspeakers on a first-come-first-served basis. Such operation may be universal (e.g., throughout the premises) or zone-by-zone. For example, a family room might be designated as a zone in which audio presentation is determined on a first-come-first-served basis, while kitchen and dining room zones might be designated as zones in which a user-based priority and/or content-based priority is utilized. Also for example, block 230 may comprise utilizing a first-come-first-served decision criterion when a conflict involves multiple users having a same priority.

In yet another example implementation, block 230 may comprise determining to blend audio content for presentation at one or more loudspeakers. In an example scenario in which a first user is watching and listening to television and a second user passes through the room having a telephone conversation, block 230 may comprise blending the television and telephone audio while the second user passes through the room. Note that such blending may be equal, but may also be priority-based (e.g., volume weighted toward the content already being played, volume weighted toward a higher priority user in the affected audio presentation zone, etc.). Also note that such blending may be time and/or location-based (e.g., volume weighted away from a second user that just enters a room (or zone), weighted evenly with the second user when the second user is in the middle of the room, weighted away from the second user as the second user leaves the room, etc.). Additionally, for example, such blending may be performed while performing soft-muting, for example muting lower priority content over a non-zero time period (e.g., a 20-100 millisecond period or longer), while ramping up the higher priority content.

In yet another example implementation, block 230 may comprise determining whether to present the audio content at one or more loudspeakers based at least in part on a "quiet zone" status. For example, a user that is planning to sleep, work, or otherwise desires a quiet area may provide a user input that designates the particular area as a quiet zone (e.g., a tactile or voice input, a user input at a loudspeaker, a user input at a central controller, a user input at a smart phone or other personal electronic device that is integrated with a media system implementing the method 200, etc.). For example, in an example scenario in which talk radio audio content is following a user through various audio presentation areas (or zones), the user may pass through a zone that has been designated as a quiet zone. In such an example scenario, block 230 may comprise refraining from presenting the talk radio content in the quieted zone, instead for example presenting the talk radio content in one or more zones adjacent to the quieted zone.

In still another example implementation, block 230 may comprise determining whether to present the audio content at one or more loudspeakers based at least in part on a "locked" status. For example, a user that desires to listen to music content in an uninterrupted manner may input a user command (e.g., a tactile or voice input, a user input at a loudspeaker, a user input at a central controller, a user input at a smart phone or other personal electronic device that is integrated with a media system implementing the method 200, etc.) that locks the music content being presented. In an example scenario in which telephone audio is following a user through various audio presentation areas (or zones), the user may pass through a zone that has been locked. In such an example scenario, block 230 may comprise refraining from presenting the telephone audio content in the locked zone (e.g., continuing to present the music content already being presented in the zone), instead for example presenting the telephone audio content in one or more zones adjacent to the locked zone.

Block 230 may, for example, comprise determining whether presentation of the audio content in the set of loudspeakers utilized at block 210 should be modified, and if so then implement that modification. For example, in an example scenario in which a user travels from a first audio zone (e.g., a master bath comprising a loudspeaker 141) in which audio content is presented by a first set of loudspeakers (e.g., loudspeaker 141) to a second audio zone (e.g., a master bedroom zone 130) in which audio content is presented by a second set of loudspeakers (e.g., loudspeakers 131-133), in addition to presenting the audio content at the second set of loudspeakers, block 230 may comprise determining whether to continue presenting the audio content at the first set of loudspeakers. Block 230 may comprise making such a determination in any of a variety of manners.

For example, block 230 may comprise only playing audio content at loudspeakers associated with a single audio presentation zone. For example, in an example scenario in which a user moves from a first zone to a second zone, block 230 may comprise presenting the audio content in the second zone and stopping presentation of the audio content in the first zone.

Also for example, block 230 may comprise playing the audio content in a moving window fashion (e.g., continuing to play the audio content in the most recent zone, in the two most recent zones, etc.). For example, in an example scenario in which a user moves from a first zone (e.g., master bedroom 130) to a second zone (e.g., kitchen 120) to a third zone (e.g., family room 110), block 230 may comprise newly presenting the audio content in the third zone, continuing to present the audio content in the second zone from which the user just came, and stopping presentation of the audio content in the first zone.

Additionally for example, block 230 may comprise determining whether to continue to play the audio content at a set of loudspeakers associated with a previous zone based at least in part on monitored user movement patterns. For example, in an example scenario in which a particular user or users in general have been monitored to regularly travel from a first zone (e.g., an office zone with loudspeaker 171) to a second zone (e.g., a bathroom zone with loudspeaker 151) and then return to the first zone (e.g., the office zone with loudspeaker 171), upon detecting the user traveling from the first zone to the second zone, block 230 may comprise presenting the audio content in the second zone (e.g., at the loudspeaker 151) and continuing presenting the audio content in the first zone (e.g., at the loudspeaker 171), for example at least for a set amount of time and/or until the user is detected moving to a third zone (e.g., the kitchen zone 120). Continuing the example scenario, if the user(s) has been monitored to regularly break the first-second-first zone movement pattern when the lights in the first zone (e.g., the office zone 171) are turned off upon exiting, upon detecting the user traveling from the first zone to the second zone and turning off the lights in the first zone, block 230 may comprise presenting the audio content in the second zone and stopping the presentation of the audio content in the first zone.

Many additional examples of audio content presentation, for example with regard to audio content identification, obtaining audio content, determining audio presentation characteristics, etc., are presented in U.S. patent application Ser. No. 14/725,904, filed May 29, 2015, titled "Multi-zone Media System and Method for Providing Multi-zone Media," the contents of which are hereby incorporated herein by reference in their entirety.

In general, block 230 may comprise presenting the audio content in a next set of loudspeakers based at least in part on the user location and/or identity determined at block 220. Various non-limiting examples of such functionality are presented herein. Accordingly, the scope of various aspects of this disclosure should not be limited by characteristics of the examples presented herein.

The example method 200 continues execution at block 295. The continued execution may comprise any of a variety of characteristics. For example, block 295 may comprise looping execution flow back up to any of the previous blocks of the example method 200 and/or to any flow diagram block discussed herein.

Figure 3:
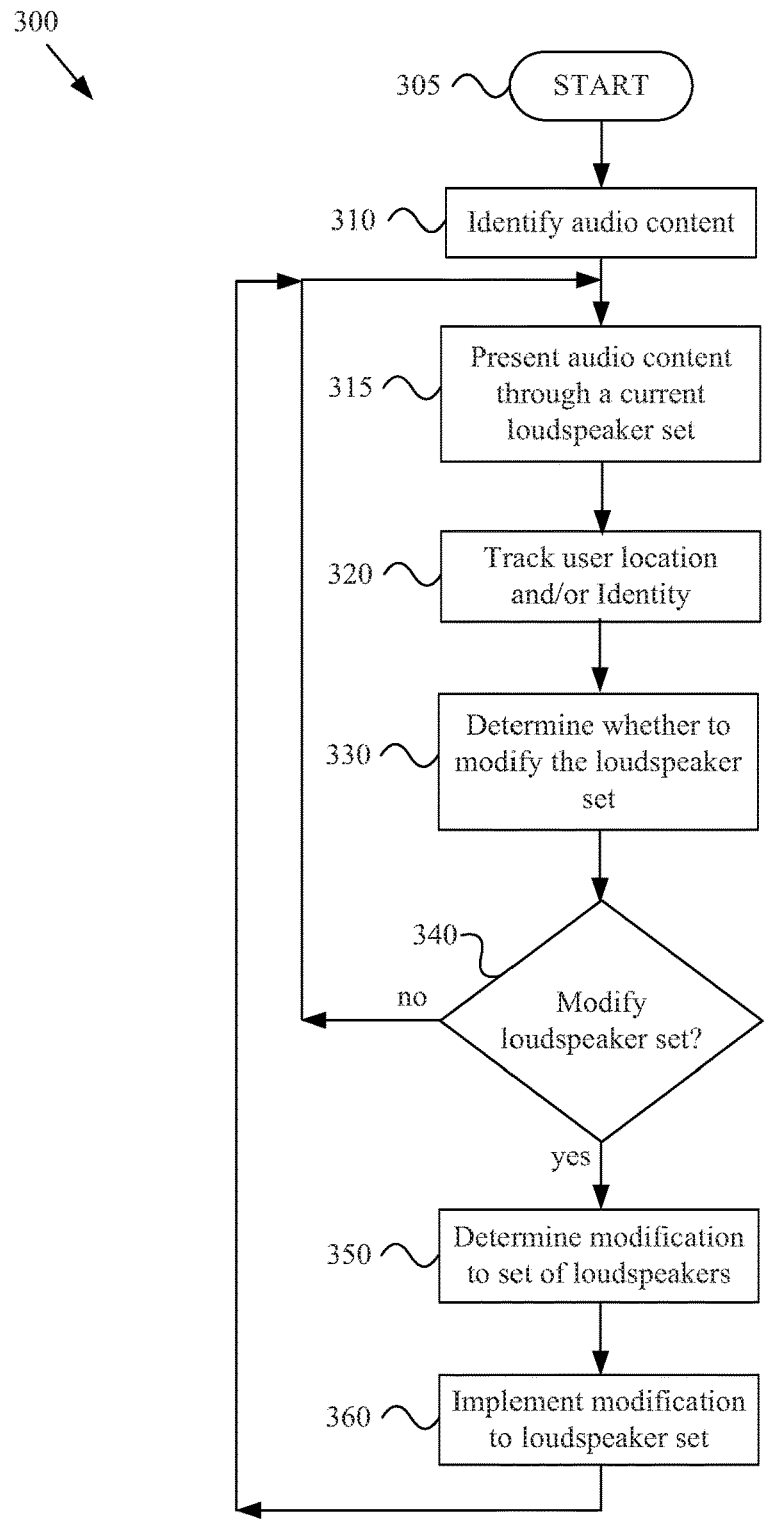
FIG. 3 is a flow diagram of another example method for providing multi-zone media, in accordance with various aspects of the present disclosure.

Turning next to FIG. 3, such figure shows a flow diagram of another example method 300 for providing multi-zone media, in accordance with various aspects of the present disclosure. The example method 300 may, for example, share any or all characteristics with the other methods discussed herein (e.g., with regard to the example methods shown in FIGS. 2 and 4-6 and discussed herein). For example, any or all blocks of the example method 300 may be integrated into any of such methods and vice versa. The example method 300, or any portion thereof, may for example be implemented at a loudspeaker, a central media controller, distributed among a plurality of system components, etc.

The example method 300 begins executing at block 305. The example method 300 may begin executing in response to any of a variety of causes or conditions. The method 300 may, for example, begin executing when a media presentation system implementing the method 300 is powered up, reset, or turned on. The method 300 may also, for example, begin executing when a media presentation system implementing the method 300 receives a command from the user to present audio content and/or to present audio content in a manner that permits the user to flexibly play or transfer music to various zones (e.g., receiving a command directly at the system, receiving a command from a remote controller, receiving a command from a user's smart phone, etc.). The method 300 may further, for example, begin executing in response to the media presentation system (e.g., a controller, loudspeaker, etc.) exiting from a sleep mode. Also for example, the method 300 may begin executing in response to detecting a user input (e.g., a touch command, a voice command, etc.) at a component of the media presentation system (e.g., at a loudspeaker, at a controller, at a sensor independent of a loudspeaker or controller, etc.). Additionally, for example, the method 300 may begin executing in response to detecting a user input at a sensor physically independent of yet communicatively coupled to a media presentation system or a component thereof, etc.). Still further for example, block 305 may receive execution flow from any of the blocks of the example method 300 and/or from any flow diagram block discussed herein (e.g., at FIGS. 2 and 4-6). In general, the method 300 may begin executing in response to any of a variety of causes or conditions. Accordingly, the scope of this disclosure should not be limited by characteristics of any particular initiating cause or condition.

The example method 300 may, at block 310, comprise identifying audio content to present (e.g., through a current set of loudspeakers). Block 310 may comprise performing such identifying in any of a variety of manners, non-limiting examples of which are provided herein.

Block 310 may, for example, comprise identifying audio content that is associated with a particular user (e.g., a particular user to which the audio content is to be presented by the current loudspeaker set). Block 310 may also, for example, comprise identifying most recently played audio content (e.g., for resuming play of such audio content) for a premises, for an audio presentation zone within a premises, for a loudspeaker or set thereof, etc. Block 310 may additionally, for example, comprise identifying audio content identified by a user input (e.g., when a user initiates the audio content presentation). Block 310 may, for example, comprise identifying a source of audio content (e.g., a radio station or channel, a streaming audio station or channel, a user playlist, a CD player, a turntable, etc.). Block 310 may further, for example, comprise identifying a most popular audio content and/or audio content source. Block 310 may also, for example, comprise identifying audio content that is or was being presented at a most recent audio presentation zone in which the user was located.

Block 310 may generally comprise identifying audio content to present. Accordingly, the scope of this disclosure should not be limited by characteristics of any particular manner of performing such identifying.

The example method 300 may, at block 315 comprise presenting audio content through a current set of one or more loudspeakers. Block 315 may, for example, share any or all characteristics with block 210 of the example method 200 illustrated in FIG. 2 and discussed herein.

Block 315 may, for example, comprise determining or selecting audio presentation characteristics for the audio content. For example, there may be a default volume and/or equalization for audio presentation for all loudspeakers, all loudspeakers of a group, or each individual loudspeaker. In such a scenario, block 315 may simply identify the default characteristics.

Also for example, block 315 may comprise retrieving the most recent audio presentation characteristics from memory (e.g., local or remote memory). For example, each loudspeaker may maintain a record of the most recent volume, equalization characteristics, etc., and then select such audio presentation characteristics for the next presented audio.

Additionally, for example, block 315 may comprise receiving the audio presentation characteristics from a central media controller and/or from other loudspeakers already playing the audio content. For example, if the audio content is already being played by one or more other loudspeakers, block 315 may comprise determining the audio presentation characteristics for the audio content that is already being played, and matching such audio presentation characteristics. In such a manner, the audio presentation characteristics (e.g., volume, equalization, etc.) can be synchronized over multiple groups of loudspeakers or audio presentation zones of the premises. For example, if a user turns up the volume of a favorite song in a first area of the home serviced by a first group of loudspeakers (e.g., by tactile volume control input, voice volume control input, remote controller volume control input, etc.), when the system continues to present the audio in a next area of the home (e.g., triggered by a user "play" input received at a loudspeaker in that next area), the system may continue to present the audio at the increased volume. For example, audio presentation characteristics may be stored in and/or retrieved from an audio presentation profile that may be system-based, user-specific, zone-specific, etc.

Additionally for example, block 315 may comprise determining (e.g., retrieving from memory) audio presentation characteristics associated with a particular user that is utilizing the system. For example, a user profile may be maintained for audio presentation for that user. When the particular user is utilizing the system, the system may present audio content for the user in accordance with the user profile. For example, block 315 may comprise determining a first volume for content being presented to a first user, and a second volume for content being presented to a second user. User identification may be determined in any of a variety of manners (e.g., by user tactile input and/or recognition, user voice input and/or recognition, identification of user electronic signature, by a user input explicitly identifying the user, etc.).

Block 315 may generally comprise presenting audio content through a current set of one or more loudspeakers. Various non-limiting examples of such operation are presented herein. The scope of this disclosure, however, should not be limited by characteristics of any particular manner of presenting audio content.

The example method 300 may, at block 320, comprise tracking user location and/or identity. Block 320 may, for example, share any or all characteristics with block 220 of the example method 200 illustrated in FIG. 2 and discussed herein. The scope of this disclosure, however, should not be limited by characteristics of any particular manner of presenting audio content.

The example method 300 may, at block 330, comprise determining whether to modify the loudspeaker set at which the audio content is being played. Block 330 may, for example, comprise determining whether to modify the loudspeaker set based at least in part on the location and/or identity tracking performed at block 320. Many example aspects of loudspeaker selection, for example addition of loudspeakers or removal of loudspeakers, were provided in the discussion of block 230 of the example method 200 illustrated in FIG. 2.

For example, block 330 may comprise determining whether to modify the loudspeaker set based at least in part on user and/or content priority, first-come-first-served considerations, present zone only operation, moving window operation, time-of-day, day-of-week, audio presentation zone and/or loudspeaker identity, locked status, quiet zone status, etc. Though various illustrative examples have been provided herein, the scope of this disclosure should not be limited by characteristics of any particular manner of determining whether to modify the loudspeaker set through which audio content is being presented.

The example method 300 may, at block 340, comprise directing execution flow of the example method 300. For example, if it is determined at block 330 that the loudspeaker set through which audio content is being presented is not to be modified, then block 340 may direct execution flow of the method 300 back up to block 315 for continued audio presentation at the present set of loudspeakers. If, however, it is determined at block 330 that the loudspeaker set through which the audio content is being presented is to be modified, then block 340 may direct execution flow of the method 300 to block 350 for modifying the loudspeaker set.

The example method 300 may, at block 350, comprise determining the modification to the set of loudspeakers at which the audio content is being played. Block 350 may, for example, comprise determining the modification to the set of loudspeakers (e.g., membership in the set of loudspeakers) based at least in part on the location and/or identity tracking performed at block 320. Many example aspects of loudspeaker selection, for example addition of loudspeakers or removal of loudspeakers, were presented in the discussion of block 230 of the example method 200 illustrated in FIG. 2.

For example, block 350 may comprise determining the modification to the loudspeaker set based at least in part on user and/or content priority, first-come-first-served considerations, present zone only operation, moving window operation, time-of-day, day-of-week, audio presentation zone and/or loudspeaker identity, locked status, quiet zone status, any of a variety of general conflict resolution criteria, etc.

Block 350 may also, for example, comprise determining audio presentation characteristics (e.g., volume, bass/treble, equalization, stereo, monaural, surround, general special effects, etc.). Various examples of such determining are presented herein, for example in the discussion of block 315. As another example, block 350 may comprise determining the audio presentation characteristics to be the same as those determined at block 315, but may also be different. For example, block 350 may comprise determining audio presentation characteristics that are specific to the modified set of loudspeakers. For example in an example scenario in which a user moves from the family room into a bedroom, block 350 may comprise determining a lower volume for the audio presentation in the bedroom_than the volume at which the audio content was presented in the family room.

Block 350 may generally comprise determining the modification to the set of loudspeakers at which the audio content is being played and/or determining audio presentation characteristics at each loudspeaker of the set of loudspeakers. Though various illustrative examples have been provided herein, the scope of this disclosure should not be limited by characteristics of any particular manner of determining a modification of the loudspeaker set through which audio content is being presented.

The example method 300 may, at block 360, comprise implementing the determined modification, for example to the set of loudspeakers at which audio content will be presented and/or respective audio presentation characteristics of each of the loudspeakers. Block 360 may, for example, share any or all characteristics with blocks 210 and 230 of the example method 200 illustrated at FIG. 2 and discussed herein.

Block 360 may, for example, comprise synchronizing the audio content presented at the modified set of loudspeakers. Block 360 may also, for example, comprise managing the routing of the audio content to the modified set of loudspeakers. Such routing management may, for example, comprise managing membership in a multicast group of loudspeakers to which the audio content is communicated (e.g., adding new loudspeakers to the multicast group and/or removing former loudspeakers from the multicast group). Such routing management may, for example, comprise managing membership in a list of loudspeakers with which communication is performed utilizing unicast communication. Such routing management may, for example, comprise establishing the necessary communication links between components of the system (e.g., between loudspeakers, between loudspeakers and a central controller, between loudspeakers and a local or remote audio content source, etc.). Block 360 may, for example, comprise communicating information of determined audio presentation characteristics to the loudspeakers of the modified set of loudspeakers. Also for example, block 360 may comprise managing loudspeakers entering or leaving low-power (or sleep) modes of operation.

In general, block 360 may comprise implementing the modification determined at block 350, for example to the set of loudspeakers at which audio content will be presented and/or respective audio presentation characteristics of each of the loudspeakers. Accordingly, the scope of this disclosure should not be limited by characteristics of any particular manner of implementing a modification to a loudspeaker set.

After block 360, execution flow of the example method 300 may, for example, return to a previous step (e.g., block 315), for example for continued audio content presentation, user tracking, and loudspeaker set modification.

As discussed herein, various aspects of this disclosure comprise generally operating in accordance with user inputs. Such user inputs may, for example, comprise user inputs to select audio content, control audio presentation characteristics, explicitly identify which loudspeakers to utilize (or not utilize) for audio presentation, etc. Many examples of such user inputs and/or control are also provided in U.S. patent application Ser. No. 14/725,904, filed May 29, 2015, titled "Multi-zone Media System and Method for Providing Multi-zone Media," the contents of which are hereby incorporated herein by reference in their entirety. In the next example, various aspects of this disclosure comprise receiving a user input that identifies to the audio presentation system whether the audio presentation system is to follow the user around (e.g., around a premises) utilizing a dynamically adjusted set of loudspeakers to present audio content, refrain from following the user and utilize a static set of loudspeakers to present audio content, etc.

Figure 4:
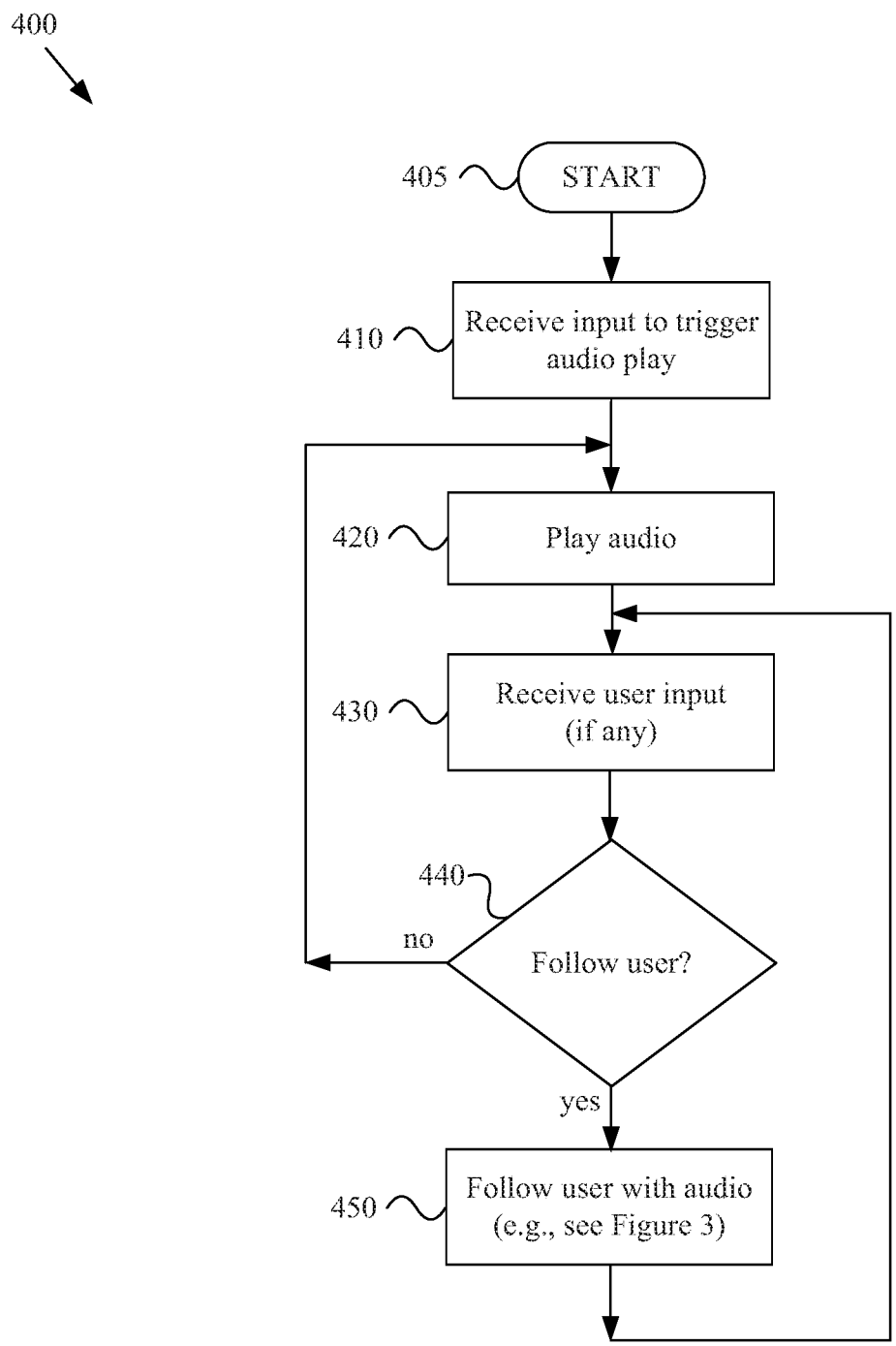
FIG. 4 is a flow diagram of an additional example method for providing multi-zone media, comprising follow-user control, in accordance with various aspects of the present disclosure.

Referring next to FIG. 4, such figure is a flow diagram of an additional example method 400 for providing multi-zone media, comprising follow-user control, in accordance with various aspects of the present disclosure. The example method 400 may, for example, share any or all characteristics with any of the methods discussed herein (e.g., the methods 200, 300, 500, and 600). For example, any or all blocks of the example method 400 may be integrated into any of such methods and vice versa. In an example implementation, any portion or all of the methods discussed herein may be initiated by a user command to follow the user with audio content, as will be discussed below. The example method 400, or any portion thereof, may for example be implemented at a loudspeaker, a central media controller, distributed among a plurality of system components, etc.

The example method 400 begins executing at block 405. The method 400 may begin execution in response to any or a variety of causes or conditions. For example, block 405 may share any or all characteristics with the example blocks 205, 305, 505, and 605 discussed herein.

The method 400 may, for example, begin executing when a media presentation system implementing the method 400 is powered up, reset, or turned on. The method 400 may also, for example, begin executing when a media presentation system implementing the method 400 receives a command from a user to present audio content and/or to present audio content in a manner that permits the user to flexibly play or transfer music to various zones (e.g., receiving a command directly at the system, receiving a command from a remote controller, receiving a command from a user's smart phone, etc.). The method 400 may further, for example, begin executing in response to the media presentation system (e.g., a controller, loudspeaker, etc.) exiting from a sleep mode. Also for example, the method 400 may begin executing in response to detecting a user input (e.g., a touch command, a voice command, etc.) at a component of the media presentation system (e.g., at a loudspeaker, at a controller, at a sensor independent of a loudspeaker or controller, etc.). Additionally, for example, the method 400 may begin executing in response to detecting a user input at a sensor physically independent of yet communicatively coupled to a media presentation system or a component thereof, etc.). Still further for example, block 405 may receive execution flow from any of the blocks of the example method 400 and/or from any flow diagram block discussed herein (e.g., at FIGS. 2, 3, 5, and 6). In general, the method 400 may begin executing in response to any of a variety of causes or conditions. Accordingly, the scope of this disclosure should not be limited by characteristics of any particular initiating cause or condition.

The example method 400 may, at block 410, comprise receiving an input (e.g., a user input) to trigger audio play. Many examples of user inputs are presented herein. For example, such a user input may comprise a tactile input at a switch or touch sensor, a voice input at a microphone or loudspeaker, a signal received from a remote controller, a signal received from a smartphone operating in accordance with a controller application, etc. For example, block 410 may comprise receiving a user command to present audio content associated with a streaming audio channel, to play songs on a playlist, to present a talk radio program, to conduct a telephone conversation, etc.

In response to the user input received at block 410, the example method 400 may, at block 420, comprise presenting the audio content. Block 420 may, for example, share any or all characteristics with any or all other audio presentation blocks discussed herein.

The example method 400 may, at block 430, comprise receiving a user input. The user input may, for example, comprise a command to adjust audio presentation characteristics, to present different audio content, to stop presenting audio content, etc. The user input may also, for example, comprise a user input that indicates whether the media presentation system (e.g., a media presentation system implementing any or all methods discussed herein, or portions thereof) is to follow the user with audio content while the user travels throughout a premises or other area.

For example, block 430 may comprise receiving a voice command at a microphone of a loudspeaker, of a central controller, through a smart phone or remote control, etc., that tells the system to follow the user. For example upon or after initiating the presentation of audio content, the user may say "follow me" to the system, or conversely "stop following me." Voice recognition technology may, for example, be integrated with the system to identify a set of one or more enumerated voice commands. Voice recognition technology may also, for example, be utilized to identify the user. Note that in an example implementation that includes a loudspeaker, a same loudspeaker may be utilized as both a loudspeaker and as a microphone. Such operation as both a loudspeaker and as a microphone may be performed in a time-duplexed manner, for example serially alternating between functioning as a loudspeaker and as a microphone. Such operation may also be performed in parallel. For example, even when a loudspeaker is being utilized to output sound, the loudspeaker is also sensitive to sound inputs, which can separated from the output sound and analyzed as a sound input.

The example method 400 may, at block 440, comprise directing execution flow of the method 400. For example, in a scenario in which the user input blocks (e.g., block 410 and/or block 430 and/or block 405) have not received a user input indicating that the media presentation system is to follow the user with audio content as the user travels throughout a premises, or have received a user input explicitly indicating that the media presentation system is not to follow the user, block 440 may direct execution flow back up to block 420 for continued audio playing and monitoring for user input. Also for example, in a scenario in which the user input blocks (e.g., block 410 and/or block 430 and/or block 405) have received a user input indicating that the media presentation system is to follow the user with audio content, block 440 may direct execution flow of the method 400 to block 450 to execution user-following functionality.

The example method 400 may, at block 450 comprise executing user-following functionality, for example as presented herein with reference to any one or more of the methods illustrated in FIGS. 2, 3, 5, and 6. After block 450, execution flow of the example method 400 may return back up to any previous block, for example to block 430 for continued user input monitoring and audio presentation that follows a user throughout a premises.

Figure 5:
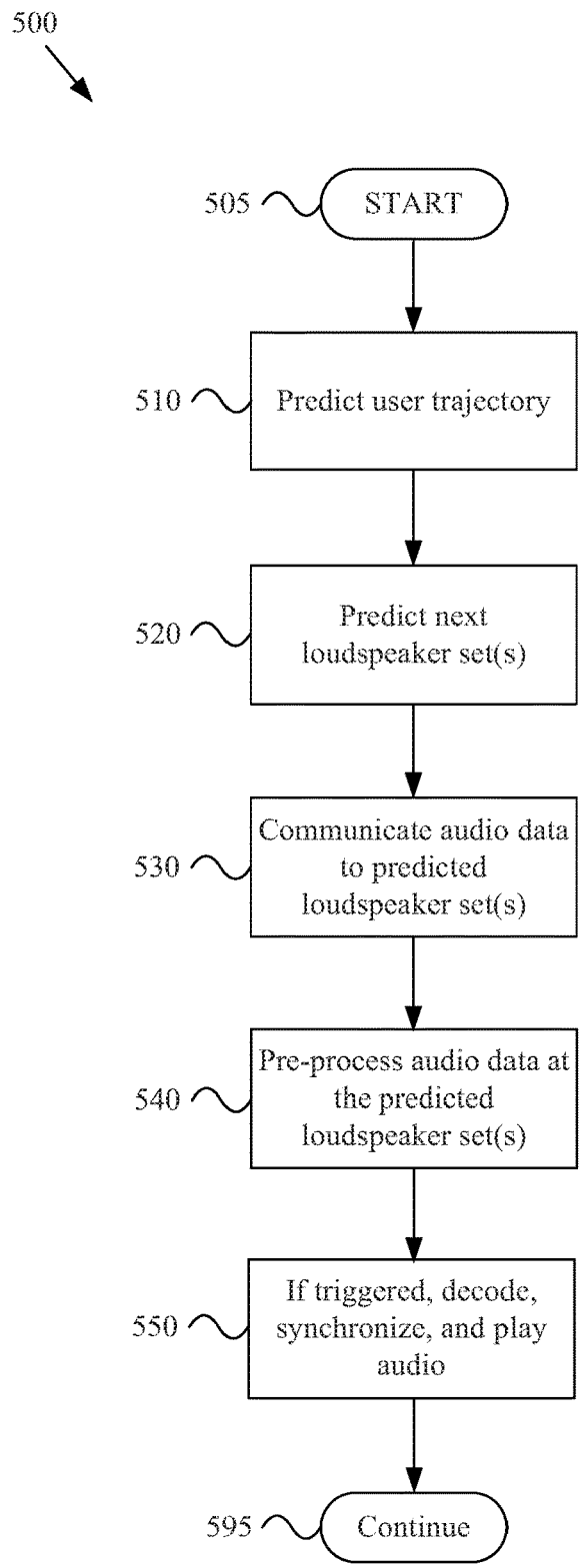
FIG. 5 is a flow diagram of yet another example method for providing multi-zone media, comprising zone pre-process, in accordance with various aspects of the present disclosure.

In accordance with various aspects of this disclosure, audio content may be preemptively obtained and processed (e.g., at a loudspeaker or associated device) prior to the need for the audio content at the loudspeaker arising. Such obtaining and processing may, for example, eliminate or reduce latency in audio content presentation in response to a determination to present the audio content. Such obtaining and processing may, for example, be performed at all loudspeakers and/or other components of the media presentation system. Alternatively, such obtaining and processing may also be performed at an identified loudspeaker or group thereof. For example, one or more loudspeakers may be identified as the most likely loudspeakers to be involved in a next presentation of the audio content. Such identified loudspeakers (or associated devices) may then perform the preemptive obtaining and processing. FIG. 5 provides an example of such operation.

FIG. 5 is a flow diagram of an additional example method 500 for providing multi-zone media, in accordance with various aspects of the present disclosure. The example method 500 may, for example, share any or all characteristics with the other methods discussed herein. For example, one or more aspects of the example method 500 may be incorporated into any of the other methods discussed herein. For example, any or all blocks of the example method 400 may be integrated into any of such methods and vice versa. The example method 500, or any portion thereof, may be implemented at a loudspeaker, a central media controller, distributed among a plurality of system components, etc.

The example method 500 begins executing at block 505. The example method 500 may begin executing in response to any of a variety of causes or conditions. The method 500 may, for example, begin executing when a media presentation system implementing the method 500 is powered up, reset, or turned on. The method 500 may also, for example, begin executing when media presentation system implementing the method 500 receives a command from the user to present audio content and/or to present audio content in a manner that permits the user to flexibly play or transfer music to various zones (e.g., receiving a command directly at the system, receiving a command from a remote controller, receiving a command from a user's smart phone, etc.). The method 500 may further, for example, begin executing in response to the media presentation system (e.g., a controller, loudspeaker, etc.) exiting from a sleep mode. Also for example, the method 500 may begin executing in response to detecting a user input (e.g., a touch command, a voice command, etc.) at a component of the media presentation system (e.g., at a loudspeaker, at a controller, at a sensor independent of a loudspeaker or controller, etc.). Additionally, for example, the method 500 may begin executing in response to detecting a user input at a sensor physically independent of yet communicatively coupled to a media presentation system or a component thereof, etc.). Still further for example, block 505 may receive execution flow from any of the blocks of the example method 500 and/or from any flow diagram block discussed herein (e.g., at FIGS. 2-4 and 6). In general, the method 500 may begin executing in response to any of a variety of causes or conditions. Accordingly, the scope of this disclosure should not be limited by characteristics of any particular initiating cause or condition.

The example method 500 may, at block 510, comprise predicting a user trajectory (e.g., within a premises in which audio content is being presented to the user). Block 510 may, for example, predict a most likely next presentation area based at least in part on the presentation areas in which the audio content has been presented to the user. For example, referring to FIG. 1, if the user initiated audio presentation in the first area 110 followed by the third area 130, block 510 may predict the fourth area (e.g., including the loudspeaker 141) as a next likely area in the user trajectory. Also for example, if the user initiated audio presentation in the first area 110 followed by the second area 120, block 510 may predict that the user will likely return to the first area 110.

Block 510 may predict one or more most likely user trajectories in any of a variety of manners. For example, block 510 may comprise performing such prediction based at least in part on known monitored user movement patterns. For example, if at 6:00 pm on weekday evenings, the user habitually moves from the third area 130 to the second area 120 to the first area 110, block 510 may, for example upon determining that the time is near 6:00 pm and seeing the user initiate audio content presentation in the third area 130 and then the second area 120, determine that the user is likely to move next into the first area 110 and request audio content presentation there. In another scenario, block 510 may determine that the next most likely user trajectory includes a trajectory to any area (or audio zone) adjacent to the current area in which the audio content is being presented. For example, all areas into which the user may move next may be selected. In another scenario, block 510 may utilize a generally linear model, assuming that the most likely user movement is in a generally line, and select one or more next areas in or adjacent to a straight line formed or fitted to the user's most recent two, three, or more areas. Accordingly, the scope of this disclosure should not be limited by characteristics of any particular manner of predicting user trajectory.

The example method 500 may, at block 520, for example based at least in part on the prediction(s) of block 510, identify (or predict) a set of likely next loudspeakers to present the audio content. For example, upon prediction of a user trajectory into a next area, block 520 may identify the loudspeakers associated with presenting audio content in the predicted next area. For example, referring to FIG. 1, identification of the first area 110 by block 510 may result in block 520 identifying the loudspeakers 112-115. Also for example, identification of the fifth, sixth, and seventh areas by block 510 may result in block 520 identifying the loudspeaker 151, loudspeaker 161, and loudspeaker 171.

The example method 500 may, at block 530, comprise communicating the audio content to the identified loudspeakers (e.g., in a broadcast or multicast communication, in a unicast communication to each loudspeaker, etc.). For example, block 530 may comprise establishing communication links for the communication of the audio content (e.g., bandwidth allocation, address allocation, multicast setup, etc.). Block 530 may, for example, share any or all characteristics (e.g., with regard to identifying, obtaining, and/or communicating audio content) with blocks 210, 230, 310, 315, 360, 420, and 450 of the example methods 200, 300, and 400 shown in FIGS. 2-4 and discussed herein.

The example method 500 may, for example at block 540, comprise pre-processing audio data at the identified loudspeaker(s). Block 540 may, for example, share any or all characteristics (e.g., with regard to processing audio data) with blocks 210, 230, 310, 315, 360, 420, and 450 of the example methods 200, 300, and 400 shown in FIGS. 2-4 and discussed herein. As mentioned herein, the obtaining and processing of audio content may be performed prior to the determination of a present need for the audio content at a particular loudspeaker.

The example method 500 may, for example at block 550, comprise processing and playing the audio content at the identified next loudspeaker(s) if triggered (e.g., by a user input). Other examples of the general methodology presented at FIG. 5 may be found in U.S. patent application Ser. No. 14/725,904, filed May 29, 2015, titled "Multi-zone Media System and Method for Providing Multi-zone Media," the contents of which are hereby incorporated herein by reference in their entirety.

The example method 500 continues execution at block 595. The continued execution may comprise any of a variety of characteristics. For example, block 595 may comprise looping execution flow back up to any of the previous blocks of the example method 500 and/or to any flow diagram block discussed herein.

As discuss with regard to the example method 500, audio data may be pre-processed in anticipation of a need for presenting the corresponding audio content as a loudspeaker or group thereof. In various aspects of the present disclosure, such audio content may actually be presented at loudspeakers in anticipation of the need. For example, as a media presentation system anticipates user travel into a particular audio presentation area (or zone), the media presentation system may present the audio content in the loudspeakers associated with the predicted audio zone or a plurality thereof. The example method 600 provides an example of such operation.

Figure 6:
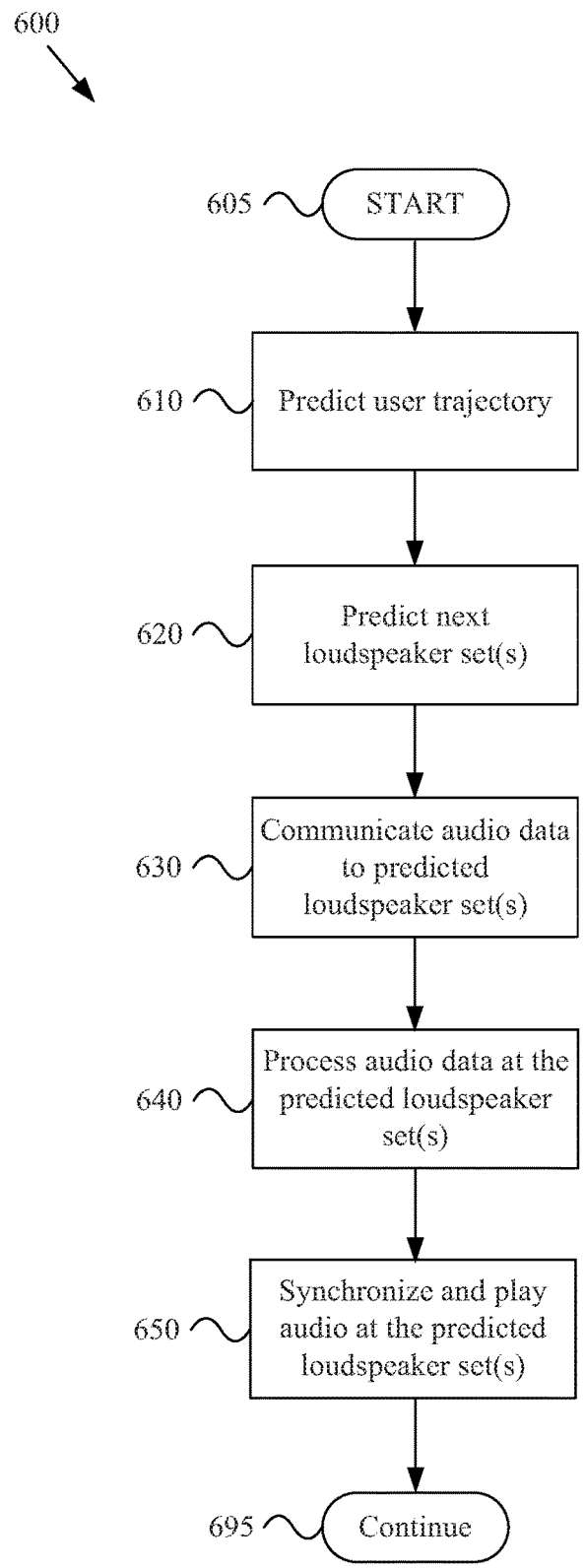
FIG. 6 is a flow diagram of yet another example method for providing multi-zone media, comprising zone pre-play, in accordance with various aspects of the present disclosure.

FIG. 6 is a flow diagram of an additional example method 600 for providing multi-zone media, in accordance with various aspects of the present disclosure. The example method 600 may, for example, share any or all characteristics with the other methods discussed herein. For example, any or all blocks of the example method 600 may be integrated into any of such methods and vice versa. The example method 600, or any portion thereof, may be implemented at a loudspeaker, a central media controller, distributed among a plurality of system components, etc.

The example method 600 begins executing at block 605. Block 605 may, for example, share any or all characteristics with block 505 of the example method 500 shown in FIG. 5 and discussed herein.

The example method 600 may, at block 610, comprise predicting a user trajectory (e.g., within a premises in which audio content is being presented to the user). Block 610 may, for example, share any or all characteristics with block 510 of the example method 500 shown in FIG. 5 and discussed herein.

The example method 600 may, at block 620, for example based at least in part on the prediction(s) of block 610, identify (or predict) a set of likely next loudspeakers at which to present the audio content. Block 620 may, for example, share any or all characteristics with block 520 of the example method 500 shown in FIG. 5 and discussed herein.

The example method 600 may, at block 630, comprise communicating the audio content to the identified loudspeakers (e.g., in a broadcast or multicast communication, in a unicast communication to each loudspeaker, etc.). Block 630 may, for example, share any or all characteristics with block 530 of the example method 500 shown in FIG. 5 and discussed herein.

The example method 600 may, for example at block 640, comprise processing audio data at the identified loudspeaker(s). Block 640 may, for example, share any or all characteristics with block 540 of the example method 500 shown in FIG. 5 and discussed herein. For example though, rather than pre-processing audio data in anticipation of the need for presentation of the associated audio content, block 640 processes the audio data for immediate presentation of the audio content at one or more loudspeakers in anticipation of the need for presentation of such audio content at such one or more loudspeakers.

The example method 600 may, for example at block 650, comprise synchronizing and playing the audio content at the predicted next loudspeaker(s), for example even before the actual need for such audio content presentation materializes. Block 650 may, for example, share any or all characteristics with any of the example method blocks herein that present audio content. Block 650 may also, for example, present the audio content at different audio presentation characteristics (e.g., volume) depending on the distance between the user and the predicted next loudspeaker(s). For example, the volume may be a function of the user's distance from the predicted next loudspeakers(s). For example, there may be a direct relationship between the loudspeaker amplitude and the distance between the loudspeaker and listener such that a constant loudness is perceived by the listener, even as the listener moves about the listening area. Such adaptive-characteristic functionality may also be implemented with any or all loudspeakers that are presently playing the audio content.

The example method 600 continues execution at block 695. The continued execution may comprise any of a variety of characteristics. For example, block 695 may comprise looping execution flow back up to any of the previous blocks of the example method 600 and/or to any flow diagram block discussed herein.

Whether the system operates in accordance with the example method 500 of FIG. 5 or the example method 600 of FIG. 6 may, for example, be user-configurable. For example, a user may specify whether the media presentation system is to present audio content in an audio zone in anticipation of the user's arrival in the audio zone, or whether the media presentation is to merely pre-process the audio content, or whether no pre-processing or pre-playing is to be performed.

The discussion herein has explained that the audio content being presented may be voice conversation content (e.g., telephone content, intercom content, etc.). In an example in which the audio content comprises voice conversation content, various aspects of the disclosure may comprise utilization of a microphone network to receive voice content from the user and communicate such voice content back out the network (e.g., back to another user over a telecomm network, the Internet, a cellular telephone network, intercom, etc.).

In such a scenario, the system may comprise microphones at various locations. Such microphones may, for example, be integrated in a loudspeaker housing. Also for example, loudspeakers may be used as microphones when needed to capture the user's voice content. This functionality also may be utilized for receiving voice command information from the user. Analogously to the audio content presentation discussed herein, audio input acquisition may also follow the user as the user travels through a premises. For example, as loudspeakers are selected for audio presentation to the user as the user moves, microphones may similarly be selected for detecting audio input content from the user. For example, as a user moves into an audio zone, the microphones of that zone may be selected to be the only or dominant microphones for receiving audio input content from the user.

The media presentation system may interface with any of a variety of types of telecommunication networks. For example, the system may be communicatively coupled to a landline and/or cable telecommunication network, the system may be communicatively coupled to a cellular communication network, etc. Also for example, the system may be communicatively coupled to a VoIP-based telecommunication network, for example communicating through the Internet. In an example implementation, the system may also be operable to communicate directly with a cellular telephone, and operate as an input/output extension of the cellular telephone. In another example implementation, the system may also be operable to communicate with an RF earpiece (e.g., utilizing the microphone and/or loudspeaker thereof as audio input/output devices of the system).

Figure 7:
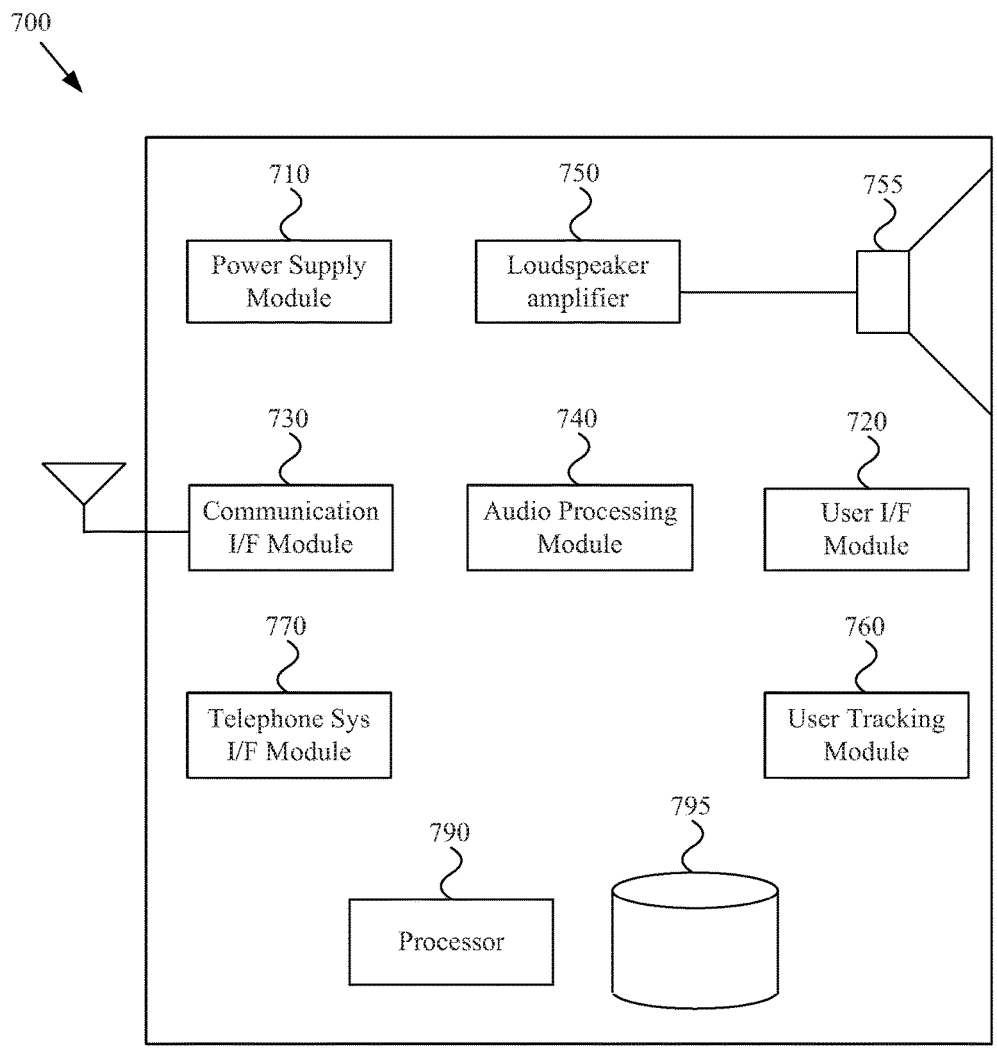
FIG. 7 is a block diagram of an example media output device, in accordance with various aspects of the present disclosure.
Figure 8:
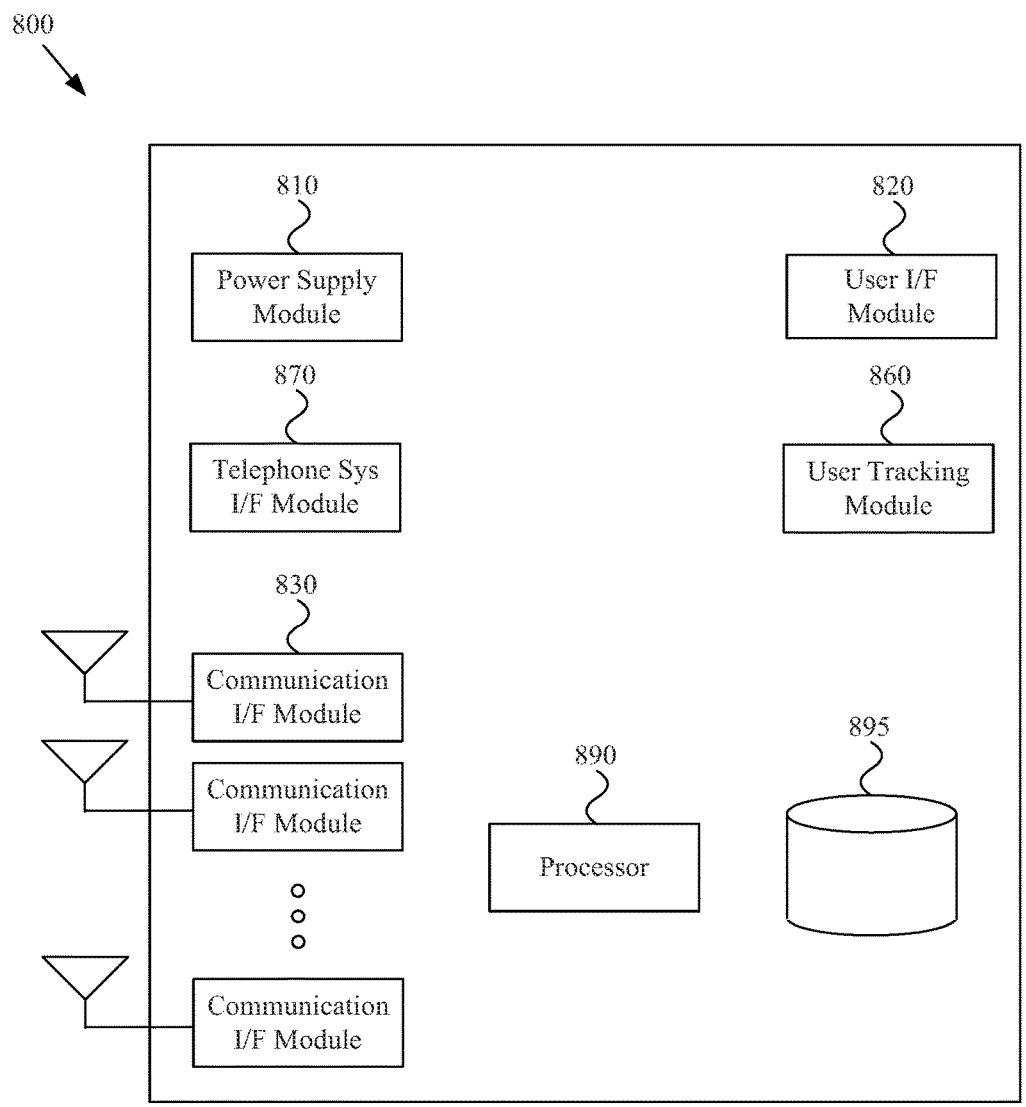
FIG. 8 is a block diagram of an example media controller, in accordance with various aspects of the present disclosure.

As explained herein, the example methods 200, 300, 400, 500 and 600 presented herein, or any portion thereof, may be performed by one or more loudspeakers, a central media controller, or other apparatus (e.g., independently or in a distributed manner). FIGS. 7 and 8 provide non-limiting examples of a media output device and a central media controller, each of which may perform any or all of the functionality discussed herein.

FIG. 7 is a block diagram of an example media output device 700, in accordance with various aspects of the present disclosure. The media output device 700 may, for example, operate to or be operable to perform any or all of the functionality discussed herein (e.g., with regard to the example methods illustrated in FIGS. 2-6 and discussed herein). The media output device 700 may, for example, comprise a loudspeaker, but the scope of this disclosure is not limited thereto. The loudspeaker may, for example, be wall-mounted, ceiling mounted, free-standing (e.g., on a floor, on a shelf, etc.), indoor, outdoor, etc. The media output device 700 may, for example, comprise any of a variety of media output devices (e.g., a video output device, etc.). The media output device 700 may, for example, share any or all characteristics with the loudspeakers shown in FIG. 1.

The example device 700 may, for example, comprise a power supply module 710. The power supply module 710 may, for example, comprise electrical circuitry operable to receive and/or prepare electrical power for utilization by the other modules of the device 700. The power supply module 710 may, for example, comprise an A/C power module adapted for plugging into a premises power outlet and/or for direct integration into the A/C power system of a premises. The power supply module 710 may also, for example, be operable to receive and/or prepare electrical power from a power-over-Ethernet (POE) system. The power supply module 710 may additionally, for example, be operable to receive and/or prepare battery power (e.g., manage battery operation for power supply, recharging, etc.). The power supply module 710 may also, for example, be operable to provide electrical power (e.g., via Ethernet or other wiring) to other media presentation devices (e.g., to other loudspeakers).

The example device 700 may also, for example, comprise a user interface module 720. The user interface module 720 may, for example, be operable to perform any or all of the user interface functionality discussed herein. For example, the user interface module 720 may be operable to perform the functionality discussed herein with regard to at least blocks 205, 220, and 230 of the example method 200 illustrated in FIG. 2, with regard to at least blocks 305, 310, and 315 of the example method 300 illustrated in FIG. 3, and with regard to at least blocks 405, 410, and 430 of the example method 400 illustrated in FIG. 4.

For example, the user interface module 720 may comprise any one or more of a variety of sensors for user input. For example, the user interface module 720 may comprise a touch sensor and associated circuitry for processing touch inputs. The touch sensor for user touch input may, for example, comprise a touch pad, touch screen, heat sensor, capacitive sensor, piezo-resistive sensor, piezo-electric sensor, light sensor, MEMS inertial sensor, etc. The touch input may, for example, comprise a tap input (e.g., single-tap, double-tap, n-tap, etc.). The touch input may, for example, comprise a touch input on a graphical user interface feature being presented to the user on a touch screen. The touch input may also, for example, comprise a swipe input (e.g., for adjustment of media presentation characteristics, like volume, etc.). Also for example, the user interface module 720 may comprise a microphone sensor and associated circuitry for processing audible inputs (e.g., voice commands).

The sensors may, for example, be included on or within an enclosure of the device 700. Additionally for example, the sensors may be physically separate from the device 700. As discussed herein, for example, touch sensors and/or microphones may be incorporated into switch plates, door frames, doors, etc., and thus need not necessarily be physically integrated with the device 700. In such example implementations, the sensors may be hardwired with the device 700 and/or may wirelessly communicate with the device 700. In a wireless communication scenario, the user interface module 720 may utilize wireless communication capability of the communication interface module 730 discussed herein.

The user interface module 720 may also, for example, comprise any one or more of a variety of user output devices (e.g., for providing audio feedback to a user, for visual output feedback to a user, etc.). For example, the user interface module 720 may operate to provide output to the user to indicate the mode of operation in which the device 700 is operating, to indicate the media output characteristics of the media currently being presented to the user, to output user input features (e.g., graphical user interface features), etc.

The user interface module 720 may further, for example, operate to interface with a remote control device (e.g., a dedicated remote control device, a smart phone, etc.). For example, the user interface module 720 may utilize the communication interface module 730 to communicate with the user's smart phone.

The example device 700 may additionally, for example, comprise a communication interface module 730. The communication interface module 730 may, for example, be operable to perform any or all of the communication functionality discussed herein (e.g., in the discussions of FIGS. 1-6). Such communication functionality may, for example, comprise communicating with other devices (e.g., other loudspeakers, central controllers, media servers, etc.). Such communication functionality may, for example, comprise communicating information regarding general system operation, user inputs, media content, etc.

The communication interface module 730 may, for example, be operable to establish, maintain, and utilize communication links with other devices (e.g., with loudspeakers, with a central media controller, with a local media server within a premises over a local area network, with a remote media server outside of a premises over the Internet, cable, landline and/or other networks, with remote control devices, smart phones, smart watches, etc.). The communication interface module 730 may, for example, be operable to communicate over wired, wireless, or optical links.

The communication interface module 730 may, for example, be operable to interface with a wired and/or wireless local area network (LAN), personal area network (PAN), wide area network (WAN), etc. The communication interface module 730 may, for example, be operable to interface with a telecommunication network (e.g., cellular, landline, satellite, etc.), a television network (e.g., cable, satellite, etc.), etc. The communication interface module 730 may, for example, be operable to communicate utilizing any of a variety of standard and/or proprietary communication protocols (e.g., Wi-Fi, Ethernet, Bluetooth, near field, 4G, 5G, LTE, MoCA, 802.15, etc.).

The example device 700 may also, for example, comprise an audio processing module 740. The audio processing module 740 may, for example, be operable to perform any or all of the audio processing functionality discussed herein. For example, the audio processing module 740 may be operable to perform functionality discussed herein with regard to blocks 210 and 230 of the example method 200 shown in FIG. 2; blocks 315 and 360 of the example method 300 shown in FIG. 3; blocks 420 and 450 of the example method 400 shown in FIG. 4; blocks 540 and 550 of the example method 500 shown in FIG. 5; blocks 640 and 650 of the example method 600 shown in FIG. 6, etc.

For example, the audio processing module 740 may be operable to manage the presentation of audio content at a loudspeaker. For example, the audio processing module 740 may be operable to process audio data (e.g., decoding, decrypting, error-correcting, queuing, digital-to-analog converting, etc.). Also for example, the audio processing module 740 may be operable to control media presentation characteristics (e.g., on/off, volume level, bass/treble or other equalization effects, balance between a plurality of loudspeakers, managing stereo and/or surround-sound media presentation, etc.).

Also for example, the audio processing module 740 may be operable to perform any or all of the loudspeaker selection functionality discussed herein. For example, the audio processing module may be operable to perform functionality discussed herein with regard to block 230 of the example method 200 shown in FIG. 2; blocks 330, 340, 350, and 360 of the example method 300 shown in FIG. 3; blocks 440 and 450 of the example method 400 shown in FIG. 4; blocks 520 and 530 of the example method 500 shown in FIG. 5; blocks 620 and 630 of the example method 600 shown in FIG. 6; etc. As with all modules shown herein, the audio processing module 740 may, for example, be implemented as a stand-alone audio processor or may share a portion of a processor with one or more other modules.

The example device 700 may further, for example, comprise a loudspeaker amplifier 750 and loudspeaker 755. The loudspeaker amplifier 750 and loudspeaker 755 may, for example, be operable to convert electrical signals into mechanical loudspeaker motion (e.g., of one or more loudspeaker membranes, cones, etc.) and thereby generate user-perceivable sound.

The example device 700 may also, for example, comprise a user tracking module 760. The user tracking module 760 may, for example, be operable to perform any or all of the user tracking and/or user trajectory prediction functionality discussed herein and/or any or all of the user identification functionality discussed herein. For example, the user tracking module 760 may be operable to perform functionality discussed herein with regard to block 220 of the example method 200 shown in FIG. 2; block 320 of the example method 300 shown in FIG. 3; block 510 of the example method 500 shown in FIG. 5; block 610 of the example method 600 shown in FIG. 6, etc.

The example device 700 may additionally, for example, comprise a telephone system interface module 770. The telephone system interface module 770 may, for example, be operable to perform any or all of the telephony functionality discussed herein. For example, the telephone system interface module 770 may utilize aspects of the communication interface module 730 to communicate with a cellular telephony network, a voice-over-Internet-Protocol (VoIP) network, the plain old telephone service (POTS) network, etc. Also for example, the telephone system interface module 770 may utilize aspects of the user interface module 720 for two-way user communication.

The example device 700 may, for example, comprise a processor 790 and a memory 795. Any or all of the functionality or associated modules discussed herein may, for example, be implemented in hardware and/or implemented using a combination of hardware and software (e.g., a processor operating in accordance with software instructions stored on a non-transitory computer-readable medium). For example, the processor 790 may operate in accordance with software instructions stored in the memory 795 to implement all or any part of the modules discussed herein. The processor 790 may, for example, comprise a general-purpose microprocessor, a digital signal processor (DSP), an application specific integrated circuit (ASIC), a microcontroller, etc. The memory 795 may, for example, comprise non-volatile and/or volatile memory. Note that the memory 790 may also be utilized for storing media content, media presentation characteristics, user profile information, etc.

As discussed herein, any or all of the functionality discussed herein may be performed by a media presentation device (e.g., a loudspeaker) or a plurality of media presentation devices working together. Also as discussed herein, any or all of the functionality discussed herein may be performed by a central media controller, a media server, etc. An example central media controller and/or media server will now be presented.

FIG. 8 is a block diagram of an example media controller 800, in accordance with various aspects of the present disclosure. The example media controller 800 may, for example, share any or all characteristics with the device 700 illustrated in FIG. 7 and discussed herein. The example media controller 800 may, for example, operate to or be operable to perform any or all of the functionality discussed herein (e.g., with regard to the example methods illustrated in FIGS. 2-6 and discussed herein). The media controller 800 may, for example, comprise a central audio controller, but the scope of this disclosure is not limited thereto. The media controller 800 may, for example, comprise any of a variety of media controller devices (e.g., audio controller, video controller, multi-media controller, etc.). The media controller 800 may, for example, share any or all characteristics with the central controller 111 shown in FIG. 1.

The example media controller 800 may, for example, comprise a power supply module 810. The power supply module 810 may, for example, comprise electrical circuitry operable to receive and/or prepare electrical power for utilization by the other modules of the media controller 800. The power supply module may, for example, comprise an A/C power module adapted for plugging into a premises power outlet and/or for direct integration into the A/C power system of a premises. The power supply module 810 may also, for example, be operable to receive and/or prepare electrical power from a power-over-Ethernet (POE) system. The power supply module 810 may additionally, for example, be operable to receive and/or prepare battery power (e.g., manage battery operation for power supply, recharging, etc.). The power supply module 810 may also, for example, be operable to provide electrical power (e.g., via Ethernet or other wiring) to media presentation devices (e.g., to loudspeakers).

The example media controller 800 may also, for example, comprise a user interface module 820. The user interface module 820 may, for example, be operable to perform any or all of the user interface functionality discussed herein. For example, the user interface module 720 may be operable to perform the functionality discussed herein with regard to at least blocks 205, 220, and 230 of the example method 200 illustrated in FIG. 2, with regard to at least blocks 305, 310, and 315 of the example method 300 illustrated in FIG. 3, and with regard to at least blocks 405, 410, and 430 of the example method 400 illustrated in FIG. 4. Also for example, the user interface module 820 may be operable to communicate with a user regarding general operation and configuration of the media presentation system controlled by the media controller 800.

For example, the user interface module 820 may comprise any one or more of a variety of sensors for user input. For example, the user interface module 820 may comprise a touch sensor and associated circuitry for processing touch inputs. The touch sensor for user touch input may, for example, comprise a touch pad, touch screen, heat sensor, capacitive sensor, piezo-resistive sensor, piezo-electric sensor, light sensor, MEMS inertial sensor, etc. The touch input may, for example, comprise a tap input (e.g., single-tap, double-tap, n-tap, etc.). The touch input may, for example, comprise a touch input on a graphical user interface feature being presented to the user on a touch screen. The touch input may also, for example, comprise a swipe input (e.g., for adjustment of media presentation characteristics, like volume, etc.). Also for example, the user interface module 820 may comprise a microphone sensor and associated circuitry for processing audible inputs (e.g., voice commands).

The sensors may, for example, be included on or within an enclosure of the media controller 800. Additionally for example, the sensors may be physically separate from the media controller 800. As discussed herein, for example, touch sensors may be incorporated into switch plates, door frames, doors, etc., and thus need not necessarily be physically integrated with the media controller 800. In such example implementations, the sensors may be hardwired with the media controller 800 and/or may wirelessly communicate with the media controller 800. In a wireless communication scenario, the user interface module 820 may utilize wireless communication capability of the communication interface module 830 discussed herein.

The user interface module 820 may also, for example, comprise any one or more of a variety of user output devices (e.g., for providing audio feedback to a user, for visual output feedback to a user, etc.). For example, the user interface module 820 may operate to provide output to the user to indicate the mode of operation in which the media controller 800 is operating, to indicate the media output characteristics of the media currently being presented to the user, to output user input features (e.g., graphical user interface features), etc.

The user interface module 820 may further, for example, operate to interface with a remote control device (e.g., a dedicated remote control device, a smart phone, etc.). For example, the user interface module 820 may utilize the communication interface module 830 to communicate with the user's smart phone.

The example media controller 800 may additionally, for example, comprise a communication interface module 830. The communication interface module 830 may, for example, be operable to perform any or all of the communication functionality discussed herein (e.g., in the discussions of FIGS. 1-6). Such communication functionality may, for example, comprise communicating with other devices (e.g., other loudspeakers, central controllers, media servers, remote controllers, smart phones, smart watches, etc.). Such communication functionality may, for example, comprise communicating information regarding general system operation, user inputs, media content, etc.

The communication interface module 830 may, for example, be operable to establish, maintain, and utilize communication links with other devices (e.g., with loudspeakers, with a central media controller, with a local media server within a premises over a local area network, with a remote media server outside of a premises over the Internet and/or other networks, etc.). The communication interface module 830 may, for example, be operable to communicate over wired, wireless, or optical links. The communication interface module 830 may, for example, comprise a plurality of separate (or time-duplexed) communication modules for communication with a plurality of media presentation devices (e.g., loudspeakers) simultaneously.

The communication interface module 830 may, for example, be operable to interface with a wired and/or wireless local area network (LAN), personal area network (PAN), wide area network (WAN), etc. The communication interface module 830 may, for example, be operable to interface with a telecommunication network (e.g., cellular, landline, satellite, etc.), a television network (e.g., cable, satellite, etc.), etc. The communication interface module 830 may, for example, be operable to communicate utilizing any of a variety of standard and/or proprietary communication protocols (e.g., Wi-Fi, Ethernet, Bluetooth, 4G, 5G, LTE, MoCA, 802.15, etc.).

Though not illustrated, the media controller 800 may comprise an audio processing module, loudspeaker amplifier, and loudspeaker, as discussed with regard to FIG. 7.

The example media controller 800 may also, for example, comprise a user tracking module 860. The user tracking module 860 may, for example, be operable to perform any or all of the user tracking and/or user trajectory prediction functionality discussed herein and/or any or all of the user identification functionality discussed herein. For example, the user tracking module 860 may be operable to perform functionality discussed herein with regard to block 220 of the example method 200 shown in FIG. 2; block 320 of the example method 300 shown in FIG. 3; block 510 of the example method 500 shown in FIG. 5; block 610 of the example method 600 shown in FIG. 6, etc.

The example media controller 800 may additionally, for example, comprise a telephone system interface module 870. The telephone system interface module 870 may, for example, be operable to perform any or all of the telephony functionality discussed herein. For example, the telephone system interface module 870 may utilize aspects of the communication interface module 830 to communicate with a cellular telephony network, a voice-over-Internet-Protocol (VoIP) network, the plain old telephone service (POTS) network, etc. Also for example, the telephone system interface module 870 may utilize aspects of the user interface module 820 for two-way user communication. In an example scenario in which the example media controller 800 is a hub of telephony communication for the media system, the telephone system interface module 870 may be operable to establish two-way communication links with loudspeakers, microphones, and other devices of the media system for the communication of telephony content therebetween.

The example media controller 800 may, for example, comprise a processor 890 and a memory 895. Any or all of the functionality or associated modules discussed herein may, for example, be implemented in hardware and/or implemented using a combination of hardware and software (e.g., a processor operating in accordance with software instructions stored on a non-transitory computer-readable medium). For example, the processor 890 may operate in accordance with software instructions stored in the memory 895 to implement all or any part of the modules discussed herein. The processor 890 may, for example, comprise a general-purpose microprocessor, a digital signal processor (DSP), an application specific integrated circuit (ASIC), a microcontroller, etc. The memory 895 may, for example, comprise non-volatile and/or volatile memory. Note that the memory 895 may also be utilized for storing media content, media presentation characteristics, user profile information, etc.

In summary, various aspects of this disclosure provide a system and method for providing user location-based multi-zone media. While the foregoing has been described with reference to certain aspects and embodiments, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular embodiment(s) disclosed, but that the disclosure will include all embodiments falling within the scope of the appended claims.

What is claimed is:

1. A system for presenting audio content, the system comprising:
   at least one module operable to, at least:
   play audio content at a first loudspeaker associated with a first audio zone and at a second loudspeaker associated with a second audio zone independent of the first audio zone, while not playing the audio content at a third loudspeaker associated with a third audio zone independent of the first and second audio zones;
   while playing the audio content at the first and second loudspeakers and not at the third loudspeaker, at least:
   monitor a location of a user; and
   based at least in part on a determination that the user has moved from the second audio zone to the third audio zone, at least:
   play the audio content at the third loudspeaker associated with the third audio zone;
   continue playing the audio content at the second loudspeaker associated with the second audio zone, at least until the user leaves the third audio zone; and
   discontinue playing the audio content at the first loudspeaker associated with the first audio zone.

2. The system of claim 1, wherein the at least one module is operable to play the audio content at the third loudspeaker associated with the third audio zone by, at least in part, operating to synchronize the audio content playing at the third loudspeaker with the audio content playing at the second loudspeaker associated with the second audio zone.

3. The system of claim 1, wherein the at least one module is operable to continue playing the audio content at the second loudspeaker associated with the second audio zone by, at least in part, operating to adjust the volume of the audio content being played at the second loudspeaker while continuing to play the audio content at the second loudspeaker at least until the user leaves the third audio zone.

4. The system of claim 1, wherein the at least one module is operable to monitor the user location independent of a personal electronic device carried by the user.

5. The system of claim 1, wherein the at least one module is operable to receive a first user voice command indicating that the system is to play audio content through loudspeakers in a manner that follows the user around a premises, and to receive a second user voice command indicating that the system is to stop following the user.

6. A system for presenting audio content, the system comprising:
at least one module operable to, at least:
play audio content at an initial loudspeaker associated with an initial audio zone;
while playing the audio content at the initial loudspeaker associated with the initial audio zone, at least:
monitor movement of a user; and
based at least in part on the monitored movement of the user, at least:
predict, based at least in part on the monitored movement of the user, at least one next audio zone in which the user will be present; and
in anticipation of the user's future presence in the predicted at least one next audio zone, play the audio content at one or more next loudspeakers associated with the predicted at least one next audio zone.

7. The system of claim 6, wherein:
the predicted at least one next audio zone comprises a first next audio zone and a second next audio zone; and
the one or more next loudspeakers comprise a first next loudspeaker associated with the first next audio zone and a second next loudspeaker associated with the second next audio zone.

8. The system of claim 6, wherein the predicted at least one next audio zone comprises an audio zone in which the user was present immediately prior to being present in the initial audio zone.

9. The system of claim 6, wherein the at least one module is operable to monitor movement of the user by, at least in part, operating to monitor operation of a home control device.

10. The system of claim 9, wherein the home control device comprises an electrical power switch.

11. The system of claim 6, wherein the at least one module is operable to monitor movement of the user by, at least in part, operating to monitor operation of a door.

12. The system of claim 6, wherein the at least one module is operable to:
predict, based at least in part on the monitored movement of the user, a travel path of the user; and
predict the at least one next audio zone based, at least in part, on the predicted travel path of the user.

13. The system of claim 6, wherein the at least one module is operable to predict the at least one next audio zone based, at least in part, on a historical pattern of user movement.

14. The system of claim 13, wherein the historical pattern of user movement is associated with a respective time of day.

15. The system of claim 13, wherein the historical pattern of user movement is associated with a respective day of the week.

16. A system for presenting audio content, the system comprising:
at least one module operable to, at least:
monitor a location of a user;
identify a loudspeaker based, at least in part, on the monitored location of the user;
identify audio content for presentation at the identified loudspeaker based, at least in part, on a user priority of the user and/or a content priority of the identified audio content; and
play the identified audio content at the identified loudspeaker,
wherein the at least one module is operable to determine the user priority based, at least in part, on time-of-day and/or day-of-week.

17. A system for presenting audio content, the system comprising:
at least one module operable to, at least:
monitor a location of a user;
identify a loudspeaker based, at least in part, on the monitored location of the user;
identify audio content for presentation at the identified loudspeaker based, at least in part, on a user priority of the user and/or a content priority of the identified audio content; and
play the identified audio content at the identified loudspeaker,
wherein the at least one module is operable to determine the user priority based, at least in part, on the monitored location of the user.

18. A system for presenting audio content, the system comprising:
at least one module operable to, at least:
monitor a location of a user;
identify a loudspeaker based, at least in part, on the monitored location of the user;
identify audio content for presentation at the identified loudspeaker based, at least in part, on a user priority of the user and/or a content priority of the identified audio content; and
play the identified audio content at the identified loudspeaker,
wherein the at least one module is operable to determine the content priority based, at least in part, on the time-of-day and/or day-of-week.

19. A system for presenting audio content, the system comprising:
at least one module operable to, at least:
monitor a location of a user;
identify a loudspeaker based, at least in part, on the monitored location of the user;
identify audio content for presentation at the identified loudspeaker based, at least in part, on a user priority of the user and/or a content priority of the identified audio content; and
play the identified audio content at the identified loudspeaker,
wherein the at least one module is operable to determine the content priority based, at least in part, on the monitored location of the user.

20. A system for presenting audio content, the system comprising:
at least one module operable to, at least:
monitor a location of a user;
identify a loudspeaker based, at least in part, on the monitored location of the user;
identify audio content for presentation at the identified loudspeaker based, at least in part, on a user priority of the user and/or a content priority of the identified audio content; and play the identified audio content at the identified loudspeaker, wherein the at least one module is operable to identify the audio content based, at least in part, on when the user entered an audio zone relative to when another user entered the audio zone.

21. A system for presenting audio content, the system comprising:
at least one module operable to, at least:
monitor a location of a user;
identify a loudspeaker based, at least in part, on the monitored location of the user;
identify audio content for presentation at the identified loudspeaker based, at least in part, on a user priority of the user and/or a content priority of the identified audio content; and
play the identified audio content at the identified loudspeaker,
wherein the at least one module is operable to identify the audio content based, at least in part, on content selection criteria that varies as a function of time.

22. A system for presenting audio content, the system comprising:
at least one module operable to, at least:
monitor a location of a user;
identify a loudspeaker based, at least in part, on the monitored location of the user;
identify audio content for presentation at the identified loudspeaker based, at least in part, on a user priority of the user and/or a content priority of the identified audio content; and
play the identified audio content at the identified loudspeaker,
wherein the at least one module is operable to identify the audio content based, at least in part, on content selection criteria that varies as a function of location.

* * * * *